US011258067B2

(12) United States Patent
Honda et al.

(10) Patent No.: US 11,258,067 B2
(45) Date of Patent: Feb. 22, 2022

(54) ELECTRODE AND ELECTROCHEMICAL DEVICE

(71) Applicant: DAIKIN INDUSTRIES, LTD., Osaka (JP)

(72) Inventors: Yoshiaki Honda, Osaka (JP); Shinichi Kinoshita, Osaka (JP); Shigeaki Yamazaki, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 330 days.

(21) Appl. No.: 16/346,639

(22) PCT Filed: Nov. 2, 2017

(86) PCT No.: PCT/JP2017/039819
§ 371 (c)(1),
(2) Date: May 1, 2019

(87) PCT Pub. No.: WO2018/084265
PCT Pub. Date: May 11, 2018

(65) Prior Publication Data
US 2020/0067097 A1  Feb. 27, 2020

(30) Foreign Application Priority Data
Nov. 2, 2016  (JP) .............................. JP2016-215523

(51) Int. Cl.
| | | |
|---|---|---|
| H01M 4/62 | (2006.01) | |
| H01G 9/04 | (2006.01) | |
| H01G 11/26 | (2013.01) | |
| H01G 11/30 | (2013.01) | |
| H01M 4/36 | (2006.01) | |
| H01M 10/052 | (2010.01) | |
| H01M 10/054 | (2010.01) | |
| H01M 4/02 | (2006.01) | |

(52) U.S. Cl.
CPC .............. *H01M 4/623* (2013.01); *H01G 9/04* (2013.01); *H01G 11/26* (2013.01); *H01G 11/30* (2013.01); *H01M 4/366* (2013.01); *H01M 10/052* (2013.01); *H01M 10/054* (2013.01); *H01M 2004/027* (2013.01); *H01M 2004/028* (2013.01)

(58) Field of Classification Search
CPC .... H01M 4/366; H01M 4/623; H01M 10/052; H01M 10/054
See application file for complete search history.

(56) References Cited

U.S. PATENT DOCUMENTS

| | | | |
|---|---|---|---|
| 6,436,481 B1 | 8/2002 | Chabrecek et al. | |
| 8,795,903 B2* | 8/2014 | Smart ............... | H01M 10/0569 429/332 |
| 10,227,288 B2* | 3/2019 | Teran ................ | H01M 10/0569 |
| 10,971,761 B2* | 4/2021 | Hu ........................ | H01M 4/362 |
| 2006/0063073 A1 | 3/2006 | Kawashima et al. | |
| 2013/0078516 A1 | 3/2013 | Taniguchi et al. | |
| 2015/0079468 A1 | 3/2015 | Hirose et al. | |

FOREIGN PATENT DOCUMENTS

| | | |
|---|---|---|
| JP | 2004-55320 A | 2/2004 |
| JP | 2004-265609 A | 9/2004 |
| JP | 2005-89682 A | 4/2005 |
| JP | 2009-110845 A | 5/2009 |
| JP | 2010-44958 A | 2/2010 |
| JP | 2013-69531 A | 4/2013 |
| WO | 03/061050 A1 | 7/2003 |

OTHER PUBLICATIONS

International Preliminary Report on Patentability with English Translation of Written Opinion for PCT/JP2017/039819 dated May 16, 2019.
Communication dated Jul. 9, 2020, from the European Patent Office in European Application No. 17868358.7.
International Search Report for PCT/JP2017/039819 dated Dec. 19, 2017 (PCT/ISA/210).

* cited by examiner

*Primary Examiner* — Amanda C. Walke
(74) *Attorney, Agent, or Firm* — Sughrue Mion, PLLC

(57) ABSTRACT

The present invention relates to an electrode having a perfluoropolyether group-containing compound in a surface thereof.

3 Claims, No Drawings

ELECTRODE AND ELECTROCHEMICAL DEVICE

CROSS REFERENCE TO RELATED APPLICATIONS

This application is a National Stage of International Application No. PCT/JP2017/039819 filed Nov. 2, 2017, claiming priority based on Japanese Patent Application No. 2016-215523, filed Nov. 2, 2016.

TECHNICAL FIELD

The present invention relates to an electrode and an electrochemical device, and particularly, to an alkali metal ion battery such as a lithium ion secondary battery.

BACKGROUND ART

Electrochemical devices, such as an alkali metal ion battery and an electrochemical capacitor, can have characteristic features, such as small size, high capacity and lightweight, and are used in various electronic devices. Particularly, a lithium ion secondary battery is light in weight and high in capacity and energy density. Because of this, the lithium ion secondary battery is used in a wide variety of small electronic devices, particularly, portable devices such as a smart phone, a mobile phone, a tablet terminal, a video camera and a laptop computer.

CITATION LIST

Patent Literature

Patent Literature 1: Japanese Patent Laid-Open No. 2010-44958

SUMMARY OF INVENTION

Technical Problem

These electrochemical devices typically have a pair of electrodes and an electrolyte. In the electrochemical devices, deterioration of the electrodes and decomposition of the electrolyte may occur during use or storage, with the result that capacity drops. Likewise, functional deterioration possibly occurs. For example, a lithium ion secondary battery conceivably has a problem that the electrodes are deteriorated by charge-discharge cycles and thereby battery capacity reduces. A method for improving cycle characteristics is disclosed in Patent Literature 1, in which a carboxylate or sulfonate of a perfluoropolyether group is added to an electrode to improve cycle characteristics. However, cycle characteristics improved by the method is not sufficient.

In the circumstances, an object of the present invention is to provide an electrochemical device, the function of which is suppressed from deteriorating during use or storage.

Solution to Problem

The present inventors conducted intensive studies with a view to solving the aforementioned problems. As a result, they have found that functional deterioration during use or storage can be suppressed by adding a perfluoropolyether group in an electrode of an electrochemical device. Based on the finding, they have arrived at the present invention.

According to a first aspect of the present invention, there is provided an electrode having a perfluoropolyether group-containing compound in the surface.

According to a second aspect of the present invention, there is provided an electrochemical device comprising the electrode mentioned above.

Advantageous Effects of Invention

According to the present invention, it is possible to improve the cycle capacity retention rate of an electrochemical device and suppress a resistance increase rate by using an electrode having a perfluoropolyether group-containing compound.

DESCRIPTION OF EMBODIMENTS

<Electrode>

The electrode of the present invention has a perfluoropolyether group-containing compound in a surface thereof. More specifically, the electrode of the present invention (hereinafter, the electrode will be used for collectively referring to a positive electrode and a negative electrode) is constituted of an electrode material (hereinafter, the electrode material will be used for collectively referring to a positive electrode material and a negative electrode material) and a perfluoropolyether group-containing compound present in the surface of the electrode material.

Perfluoropolyether Group-Containing Compound

As described above, the electrode of the present invention has a perfluoropolyether group-containing compound in a surface thereof.

The phrase "having a perfluoropolyether group-containing compound in a surface of the electrode" means that a perfluoropolyether group-containing compound is present in a surface of the electrode and, for example, includes a case where a perfluoropolyether group-containing compound is present on a surface of an electrode material and a case where a perfluoropolyether group-containing compound and a raw-material for an electrode material are mixed and present in a surface layer of the electrode material.

In an embodiment, the electrode of the present invention has a perfluoropolyether group-containing compound in a surface thereof, i.e., on the electrode material.

In a preferable embodiment, a perfluoropolyether group-containing compound is present as a layer formed on a surface of an electrode.

The layer of a perfluoropolyether group-containing compound can be a coating layer preferably obtained by applying a reactive perfluoropolyether group-containing compound to a surface of an electrode material.

It is not necessary to form the coating layer over the whole surface of the electrode material and sufficient to form the coating layer on the surface at which the electrode is in contact with an electrolyte. Preferably, the coating layer is formed over the whole surface of the electrode material.

The reactive perfluoropolyether group-containing compound is not limited as long as it can form a coating layer thereof on the electrode surface.

In a preferable embodiment, the reactive perfluoropolyether group-containing compound may be a compound represented by the following formula (A1), (A2), (B1), (B2), (C1), (C2), (D1), (D2), (E1) or (E2).

[Formula 1]

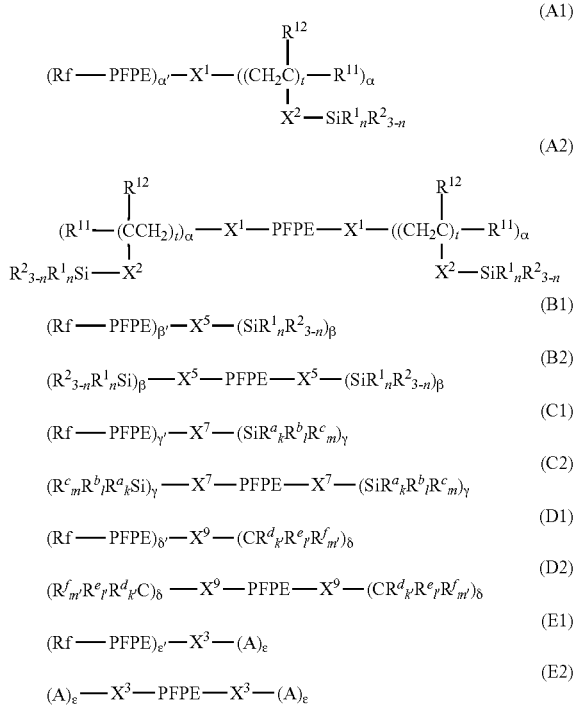

In the formulae, Rf each independently represents an alkyl group having 1 to 16 carbon atoms optionally substituted with one or more fluorine atoms.

In the phrase "the alkyl group having 1 to 16 carbon atoms optionally substituted with one or more fluorine atoms", the phrase "the alkyl group having 1 to 16 carbon atoms" may be linear or branched, and is preferably a linear or branched alkyl group having 1 to 6 carbon atoms, particularly 1 to 3 carbon atoms, and more preferably a linear alkyl group having 1 to 3 carbon atoms.

Rf preferably represents an alkyl group having 1 to 16 carbon atoms substituted with one or more fluorine atoms, more preferably a $CF_2H-C_{1-15}$ fluoroalkylene group or a perfluoroalkyl group having 1 to 16 carbon atoms, and further preferably a perfluoroalkyl group having 1 to 16 carbon atoms.

The perfluoroalkyl group having 1 to 16 carbon atoms may be linear or branched, and is preferably a linear or branched perfluoroalkyl group having 1 to 6 carbon atoms, particularly 1 to 3 carbon atoms, and more preferably a linear perfluoroalkyl group having 1 to 3 carbon atoms; specifically, $-CF_3$, $-CF_2CF_3$ or $-CF_2CF_2CF_3$.

In the above formulae, PFPE each independently represents $-(OC_6F_{12})_a-(OC_5F_{10})_b-(OC_4F_8)_c-(OC_3F_6)_d-(OC_2F_4)_e-(OCF_2)_f-$.

In the formulae, a, b, c, d, e and f each independently represent an integer of 0 or more and 200 or less and the sum of a, b, c, d, e and f is at least 1. Preferably, a, b, c, d, e and f each independently represent an integer of 0 or more and 100 or less. Preferably, the sum of a, b, c, d, e and f is 5 or more, more preferably 10 or more, for example, 10 or more and 100 or less. The repeating units enclosed in parentheses attached with a, b, c, d, e or f may be present in any order in the formula.

These repeating units may be linear or branched and are preferably linear. For example, the repeating unit, $-(OC_6F_{12})-$ may be, e.g., $-(OCF_2CF_2CF_2CF_2CF_2CF_2)-$, $(OCF(CF_3)CF_2CF_2CF_2CF_2)-$, $-(OCF_2CF(CF_3)CF_2CF_2CF_2)-$, $(OCF_2CF_2CF(CF_3)CF_2CF_2)-$, $-(OCF_2CF_2CF_2CF(CF_3)CF_2)-$, $(OCF_2CF_2CF_2CF_2CF(CF_3))-$; and is preferably $(OCF_2CF_2CF_2CF_2CF_2CF_2)-$. The repeating unit, $-(OC_5F_{10})-$ may be, e.g., $-(OCF_2CF_2CF_2CF_2)-$, $-(OCF(CF_3)CF_2CF_2CF_2)-$, $-(OCF_2CF(CF_3) CF_2CF_2)-$, $-(OCF_2CF_2CF(CF_3)CF_2)-$, $-(OCF_2CF_2CF_2CF(CF_3))-$; and is preferably $-(OCF_2CF_2CF_2CF_2CF_2)-$. The repeating unit, $-(OC_4F_8)-$ may be any one of $-(OCF_2CF_2CF_2CF_2)-$, $-(OCF(CF_3)CF_2CF_2)-$, $-(OCF_2CF(CF_3)CF_2)-$, $-(OCF(CF_3)CF(CF_3))-$, $-(OCF(C_2F_5)CF_2)-$ and $-(OCF_2CF(C_2F_5))-$; and preferably $-(OCF_2CF_2CF_2CF_2)-$. The repeating unit, $(OCF_3F_6)-$, may be any one of $-(OCF_2CF_2CF_2)-$, $-(OCF(CF_3)CF_2)-$ and $-(OCF_2CF(CF_3))-$, and is preferably $-(OCF_2CF_2CF_2)-$. The repeating unit, $-(OC_2F_4)-$ may be either one of $-(OCF_2CF_2)-$ and $-(OCF(CF_3))-$, and is preferably $-(OCF_2CF_2)-$.

In an embodiment, PFPE each independently represents $-(OC_3F_6)_d-$ wherein d represents an integer of 1 or more and 200 or less, preferably 5 or more and 200 or less, and more preferably 10 or more and 200 or less. Preferably, PFPE each independently represents $-(OCF_2CF_2CF_2)_d-$ wherein d represents an integer of 1 or more and 200 or less, preferably 5 or more and 200 or less, and more preferably 10 or more and 200 or less or $-(OCF(CF_3)CF_2)_d-$ wherein d represents an integer of 1 or more and 200 or less, preferably 5 or more and 200 or less, and more preferably or more and 200 or less. More Preferably, PFPE each independently represents $-(OCF_2CF_2CF_2)_d-$ wherein d represents an integer of 1 or more and 200 or less, preferably 5 or more and 200 or less, and more preferably 10 or more and 200 or less.

In another embodiment, PFPE each independently represents $-(OC_4F_8)_c-(OC_3F_6)_d-(OC_2F_4)_e-(OCF_2)_f-$ wherein c and d each independently represent an integer of 0 or more and 30 or less; e and f each independently represent an integer of 1 or more and 200 or less, preferably 5 or more and 200 or less, and more preferably 10 or more and 200 or less; and the repeating units enclosed in parentheses attached with c, d, e and f may be present in any order in the formula. Preferably, PFPE each independently represents $-(OCF_2CF_2CF_2CF_2)_c-(OCF_2CF_2CF_2)_d-(OCF_2CF_2)_e-(OCF_2)_f-$. In an embodiment, PFPE each independently represents $-(OC_2F_4)_e-(OCF_2)_f-$ wherein e and f each independently represent an integer of 1 or more and 200 or less, preferably 5 or more and 200 or less, and more preferably 10 or more and 200 or less; and the repeating units enclosed in parentheses attached with e and f may be present in any order in the formula.

In another embodiment, PFPE each independently represents a group represented by $-(R^6-R^7)_q-$. In the formula, $R^6$ represents $OCF_2$ or $OC_2F_4$ and preferably $OC_2F_4$. In the formula, $R^7$ represents a group selected from $OC_2F_4$, $OC_3F_6$, $OC_4F_8$, $OC_5F_{10}$ and $OC_6F_{12}$ or a combination of 2 or 3 groups independently selected from these groups. Preferably, $R^7$ represents a group selected from $OC_2F_4$, $OC_3F_6$ and $OC_4F_8$ or a combination of 2 or 3 groups independently selected from these groups. Examples of the combination of 2 or 3 groups independently selected from $OC_2F_4$, $OC_3F_6$ and $OC_4F_3$, include, but are not limited to, $-OC_2F_4OC_3F_6-$, $OC_2F_4OC_4F_8-$, $-OC_3F_6OC_2F_4-$, $-OC_3F_6OC_3F_6-$, $-OC_3F_6OC_4F_8-$, $OC_4F_8OC_4F_8-$, $-OC_4F_8OC_3F_6-$, $-OC_4F_8OC_2F_4-$, —OC$_2$F$_4$OC$_2$F$_4$OC$_3$F$_6$—, OC$_2$F$_4$OC$_2$F$_4$OC$_4$F$_8$—,
—OC$_2$F$_4$OC$_3$F$_6$OC$_2$F$_4$—, —OC$_2$F$_4$OC$_3$F$_6$OC$_3$F$_6$—,
OC$_2$F$_4$OC$_4$F$_8$OC$_2$F$_4$—, —OC$_3$F$_6$OC$_2$F$_4$OC$_2$F$_4$—,
—OC$_3$F$_6$OC$_2$F$_4$OC$_3$F$_6$—, OC$_3$F$_6$OC$_3$F$_6$OC$_2$F$_4$—, and
—OC$_4$F$_8$OC$_2$F$_4$OC$_2$F$_4$—. The reference symbol q shown above represents an integer of 2 to 100, and preferably an integer of 2 to 50. In the above formulae, OC$_2$F$_4$, OC$_3$F$_6$, OC$_4$F$_8$, OC$_5$F$_{10}$ and OC$_6$F$_{12}$ may be linear or branched and preferably linear. In this embodiment, preferably, PFPE each independently represents —(OC$_2$F$_4$—OC$_3$F$_6$)$_q$— or —(OC$_2$F$_4$—OC$_4$F$_8$)$_q$—.

In the above formulae, $R^1$ each independently in each occurrence represents a hydrogen atom or an alkyl group having 1 to 22 carbon atoms, and preferably an alkyl group having 1 to 4 carbon atoms.

In the above formulae, $R^2$ each independently in each occurrence represents a hydroxyl group or a hydrolyzable group.

The "hydrolyzable group" as used herein refers to a group that can be removed from a main skeleton of a compound by a hydrolysis reaction. Examples of the hydrolyzable group include —OR, —OCOR, —O—N=CR$_2$, —NR$_2$, —NHR and halogen (in these formulae, R represents a substituted or unsubstituted alkyl group having 1 to 4 carbon atoms), and preferably is —OR (i.e., alkoxy group). Examples of R include an unsubstituted alkyl group such as a methyl group, an ethyl group, a propyl group, an isopropyl group, a n-butyl group and an isobutyl group; and a substituted alkyl group such as a chloromethyl group. Of them, an alkyl group, particularly, an unsubstituted alkyl group is preferable; and a methyl group or an ethyl group is more preferable. The hydroxyl group, although it is not limited, may be a group generated by hydrolyzation of a hydrolyzable group.

In the above formulae, $R^{11}$ each independently in each occurrence represents a hydrogen atom or a halogen atom. The halogen atom is preferably an iodine atom, a chlorine atom or a fluorine atom, and more preferably a fluorine atom.

In the above formulae, $R^{12}$ each independently in each occurrence represents a hydrogen atom or a lower alkyl group. The lower alkyl group is preferably an alkyl group having 1 to 20 carbon atoms, and more preferably an alkyl group having 1 to 6 carbon atoms, such as a methyl group, an ethyl group and a propyl group.

In the above formulae, n independently represents an integer of 0 to 3 in each (SiR$^1_n$R$^2_{3-n}$) unit, preferably an integer of 0 to 2, and more preferably 0. It is noted that, n does not simultaneously represent 0 in the all formulae. In other words, in the formulae, at least one $R^2$ is present.

In the above formulae, preferably t each independently represents an integer of 1 to 10. In a preferable embodiment, t represents an integer of 1 to 6. In another preferable embodiment, t represents an integer of 2 to 10, and preferably 2 to 6.

In the above formulae, $X^2$ each independently in each occurrence represents a single bond or a divalent organic group. $X^2$ represents preferably an alkylene group having 1 to 20 carbon atoms, and more preferably —(CH$_2$)$_u$— wherein u represents an integer of 0 to 2.

In the above formulae, $R^a$ each independently in each occurrence represents —Z—SiR$^{71}_p$R$^{72}_q$R$^{73}_r$.

In the formula, Z each independently in each occurrence represents an oxygen atom or a divalent organic group.

Z herein preferably represents a divalent organic group. In a preferable embodiment, Z is not a group which forms a siloxane bond with a Si atom (to which $R^a$ is bound) present at an end of the molecular backbone in formula (C1) or formula (C2).

Z herein represents preferably a C$_{1-6}$ alkylene group, —(CH$_2$)$_g$—O—(CH$_2$)$_h$— wherein g represents an integer of 1 to 6; and h represents an integer of 1 to 6 or -phenylene-(CH$_2$)$_i$— wherein i represents an integer of 0 to 6; and more preferably a C$_{1-3}$ alkylene group. These groups may be substituted with at least one substituent selected from, e.g., a fluorine atom, a C$_{1-6}$ alkyl group, a C$_{2-6}$ alkenyl group and a C$_{2-6}$ alkynyl group.

In the above formulae, $R^{71}$ each independently in each occurrence represents $R^{a\prime}$. $R^{a\prime}$ is the same as defined in $R^a$.

In $R^a$, the number of Si atoms linearly connected via group Z is at most 5. In $R^a$, if at least single $R^{71}$ is present, the number of Si atoms linearly connected via group Z is two or more; and the number of Si atoms linearly connected via group Z is at most 5. Note that, "the number of Si atoms linearly connected via group Z in $R^{a\prime\prime\prime}$" is equal to the number of repeats of —Z—Si— linearly connected with each other in $R^a$.

More specifically, an example of the case where Si atoms are connected via group Z in $R^a$ is shown below:

[Formula 2]

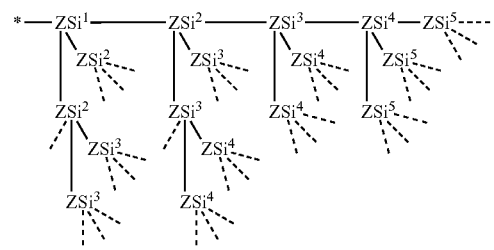

In the above formula, mark * represents a site to be bound to the Si atom of the main chain; mark " . . . " means that a predetermined group except ZSi is bound. More specifically, if three bonds of a Si atom are all expressed by " . . . ", the repeat of ZSi ends there. The numeral on the right shoulder of Si indicates the number (occurrence number) of Si atoms linearly connected via group Z and counted from the side *. To describe more specifically, a chain having ZSi repeats and ended by Si$^2$ means that "the number of Si atoms linearly connected via group Z in $R^{a\prime\prime\prime}$" is 2. Similarly, chains having ZSi repeats and ended by Si$^3$, Si$^4$ and Si$^5$ means that "the number of Si atoms linearly connected via group Z in $R^{a\prime\prime\prime}$" are 3, 4 and 5, respectively. It is noted that, as is apparent from the above formulae, a plurality of ZSi chains are present in $R^a$; and it is not necessary that these ZSi chains all have the same length and the lengths of the chains may be arbitrarily set.

In a preferable embodiment, as shown below, "the numbers of Si atoms linearly connected via group Z in $R^{a\prime\prime\prime}$" in all chains is one (the left formula below) or two (the right formula below).

[Formula 3]

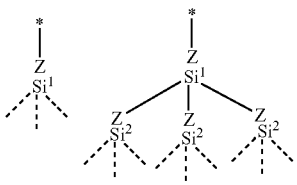

In an embodiment, the number of Si atoms linearly connected via group Z in $R^a$ is one or two and preferably one.

In the formula, $R^{72}$ each independently in each occurrence represents a hydroxyl group or a hydrolyzable group.

Preferably, $R^{72}$ represents —OR wherein R represents a substituted or unsubstituted $C_{1-3}$ alkyl group, and more preferably a methyl group.

In the formula, $R^{73}$ each independently in each occurrence represents a hydrogen atom or a lower alkyl group. The lower alkyl group is preferably an alkyl group having 1 to 20 carbon atoms, more preferably an alkyl group having 1 to 6 carbon atoms, and further preferably a methyl group.

In the formula, p each independently in each occurrence represents an integer of 0 to 3; q each independently in each occurrence represents an integer of 0 to 3; r each independently in each occurrence represents 0 to 3; and, the sum of p, q and r is 3.

In a preferable embodiment, in $R^{a1}$ at an end of $R^a$ (if $R^{a1}$ is not present, $R^a$ itself), q represents preferably an integer of 2 or more; for example, an integer of 2 or 3, and more preferably 3.

In a preferable embodiment, $R^a$ may have at least one —Si(—Z—SiR$^{72}_q$R$^{73}_r$)$_2$ or —Si(—Z—SiR$^{72}_q$R$^{73}_r$)$_3$ at an end, and preferably —Si(—Z—SiR$^{72}_q$R$^{73}_r$)$_3$. In the formula, the unit of (—Z—SiR$^{72}_q$R$^{73}_r$) is preferably (—Z—SiR$^{72}_3$). In a further preferable embodiment, the ends of $R^a$ may be all —Si(—Z—SiR$^{72}_q$R$^{73}_r$)$_3$ and preferably —Si(—Z—SiR$^{72}_3$)$_3$.

In the above formulae (C1) and (C2), at least one $R^{72}$ is present.

In the above formulae, $R^b$ each independently in each occurrence represents a hydroxyl group or a hydrolyzable group.

$R^b$ preferably represents a hydroxyl group, —OR, —OCOR, —O—N=C(R)$_2$, —N(R)$_2$, —NHR or halogen (in these formulae, R represents a substituted or unsubstituted alkyl group having 1 to 4 carbon atoms) and preferably —OR. Examples of R include an unsubstituted alkyl group such as a methyl group, an ethyl group, a propyl group, an isopropyl group, a n-butyl group and an isobutyl group; and a substituted alkyl group such as a chloromethyl group. Of them, an alkyl group, particularly an unsubstituted alkyl group, is preferable, a methyl group or an ethyl group is more preferable. The hydroxyl group, although it is not limited, may be generated by hydrolysis of a hydrolyzable group. More preferably, $R^c$ is —OR wherein R represents a substituted or unsubstituted $C_{1-3}$ alkyl group, and more preferably a methyl group.

In the above formulae, $R^c$ each independently in each occurrence represents a hydrogen atom or a lower alkyl group. The lower alkyl group represents preferably an alkyl group having 1 to 20 carbon atoms, more preferably an alkyl group having 1 to 6 carbon atoms and further preferably a methyl group.

In the above formulae, k each independently in each occurrence represents an integer of 0 to 3; l each independently in each occurrence represents an integer 0 to 3; m each independently in each occurrence represents an integer of 0 to 3. Note that, the sum of k, l and m is 3.

In the above formulae, $R^d$ each independently in each occurrence represents —Z'—CR$^{81}_p$R$^{82}_q$R$^{83}_r$.

Z' each independently in each occurrence represents an oxygen atom or a divalent organic group.

Z' is preferably a $C_{1-6}$ alkylene group, —(CH$_2$)$_g$—O—(CH$_2$)$_h$— wherein g represents an integer of 0 to 6; for example, an integer of 1 to 6, and h represents an integer of 0 to 6; for example, an integer of 1 to 6 or, phenylene-(CH$_2$)$_i$— wherein i represents an integer of 0 to 6, and more preferably a $C_{1-3}$ alkylene group. These groups may be substituted with at least one substituent selected from, for example, a fluorine atom, a $C_{1-6}$ alkyl group, a $C_{2-6}$ alkenyl group and a $C_{2-6}$ alkynyl group.

In the formula, $R^{81}$ each independently in each occurrence represents $R^{d'}$. $R^{d'}$ is the same as defined in $R^d$.

In $R^d$, the number of C atoms linearly connected via group Z' is at most 5. In $R^d$, if at least one $R^{81}$ is present, the number of Si atoms linearly connected via group Z' is two or more; and the number of C atoms linearly connected via group Z' is at most 5. Note that, "the number of C atoms linearly connected via group Z' in $R^d$" is equal to the number of repeats of —Z'—C— linearly connected in $R^d$.

In a preferable embodiment, as shown below, "the numbers of C atoms linearly connected via group Z' in $R^d$" in all chains is one (the left formula below) or two (the right formula below).

[Formula 4]

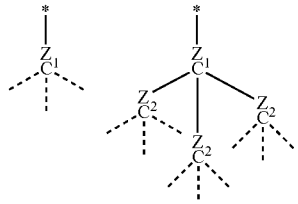

In an embodiment, the number of C atoms linearly connected via group Z' in $R^d$ is one or two and preferably one.

In the formula, $R^{82}$ represents —Y—SiR$^{85}_j$R$^{86}_{3-j}$.

Y each independently in each occurrence represents a divalent organic group.

In a preferable embodiment, Y represents a alkylene group, —(CH$_2$)$_{g'}$O—(CH$_2$)$_{h'}$— wherein g' represents an integer of 0 to 6; for example, an integer of 1 to 6, and h' represents an integer of 0 to 6; for example, an integer of 1 to 6 or -phenylene-(CH$_2$)$_{i'}$— wherein i' represents an integer of 0 to 6. These groups may be substituted, for example, with at least one substituent selected from a fluorine atom, a $C_{1-6}$ alkyl group, a $C_{2-6}$ alkenyl group and a $C_{2-6}$ alkynyl group.

In an embodiment, Y may be a $C_{1-6}$ alkylene group or -phenylene-(CH$_2$)$_{i'}$—. If Y is either one of these, light resistance, particularly ultraviolet resistance can be improved.

$R^{85}$ each independently in each occurrence represents a hydroxyl group or a hydrolyzable group. Examples of the "hydrolyzable group" are the same as those mentioned above.

Preferably, $R^{85}$ represents —OR wherein R represents a substituted or unsubstituted a $C_{1-3}$ alkyl group, more preferably an ethyl group or a methyl group, and particularly, a methyl group.

$R^{86}$ each independently in each occurrence represents a hydrogen atom or a lower alkyl group. The lower alkyl group is preferably an alkyl group having 1 to 20 carbon atoms, more preferably an alkyl group having 1 to 6 carbon atoms, and further preferably a methyl group.

Reference symbol, j independently represents an integer of 1 to 3 in each (—Y—$SiR^{85}_jR^{86}_{3-j}$ unit), preferably an integer of 2 or 3, and more preferably, 3.

$R^{83}$ each independently in each occurrence represents a hydrogen atom or a lower alkyl group. The lower alkyl group is preferably an alkyl group having 1 to 20 carbon atoms, more preferably an alkyl group having 1 to 6 carbon atoms, and further preferably a methyl group.

In the formula, p' each independently in each occurrence represents an integer 0 to 3; each independently in each occurrence represents an integer of 0 to 3; r' each independently in each occurrence represents an integer of 0 to 3; and the sum of p', q' and r' is 3.

In a preferable embodiment, in $R^{d_1}$ at an end of $R^d$ (if $R^{d_1}$ is not present, $R^a$ itself), q' represents preferably 2 or more; for example, 2 or 3, and more preferably 3.

In the above formulae, $R^e$ each independently in each occurrence represents —Y—$SiR^{85}_jR^{86}_{3-j}$, wherein Y, $R^{85}$, $R^{86}$ and j are the same as defined in $R^{82}$ in the above.

In the above formulae, $R^f$ each independently in each occurrence represents a hydrogen atom or a lower alkyl group. The lower alkyl group is preferably an alkyl group having 1 to 20 carbon atoms, more preferably an alkyl group having 1 to 6 carbon atoms, and further preferably a methyl group.

In the formulae, k' each independently in each occurrence represents an integer of 0 to 3; l' each independently in each occurrence represents an integer of 0 to 3; and m' each independently in each occurrence represents an integer of 0 to 3; and the sum of k', l' and m' is 3.

In an embodiment, at least one k' is 2 or 3 and preferably 3.

In an embodiment, k' is 2 or 3 and preferably 3.

In an embodiment, l' is 2 or 3 and preferably 3.

In the above formulae (D1) and (D2), at least one q' is 2 or 3 or at least one l' is 2 or 3. In other words, in the formulae, at least two Y—$SiR^{85}_jR^{86}_{3-j}$ groups are present.

In the above formulae, A each independently in each occurrence represents —OH, —SH, —$NH_2$, —COOH or —$SO_3H$. Preferably, A may be —OH.

In the above formulae, $X^1$ each independently represents a single bond or a 2 to 10 valent organic group. $X^1$ in compounds represented by formulae (A1) and (A2) is interpreted as a linker connecting a perfluoropolyether moiety (i.e., Rf-PFPE moiety or -PFPE- moiety) which mainly provides, e.g., water-repellency and surface lubricity, and a silane moiety (i.e., a group enclosed in parentheses attached with α) which provides binding ability to a substrate. Thus, $X^1$ may be any organic group as long as the compounds represented by formulae (A1) and (A2) can be stably present.

In the above formulae, α represents an integer of 1 to 9, and α' represents an integer of 1 to 9. The integers represented by α and α' can vary depending on the valence of $X^1$. In formula (A1), the sum of α and α' is equal to the valence of $X^1$. For example, if $X^1$ is a 10 valent organic group, the sum of α and α' is 10; for example, a case where α is 9 and α' is 1, and α is 5 and α' is 5, or α is 1 and α' is 9, can be considered. If $X^1$ is a divalent organic group, α and α' each are 1. In formula (A2), the value of a is obtained by subtracting 1 from the valence of $X^1$.

$X^1$ preferably represents a 2 to 7 valent organic group, more preferably a 2 to 4 valent organic group, and further preferably a divalent organic group.

In an embodiment, $X^1$ represents 2 to 4 valent organic group; α represents an integer of 1 to 3; and α' represents 1.

In another embodiment, $X^1$ represents a divalent organic group; α represents 1; and α' represents 1. In this case, formulae (A1) and (A2) are represented by the following formulae (A1') and (A2'), respectively.

[Formula 5]

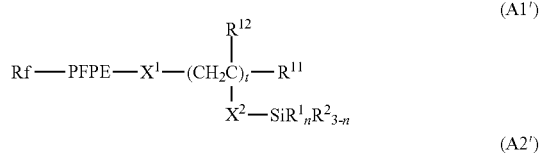

(A1')

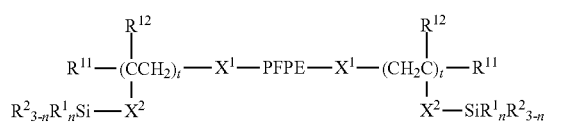

(A2')

In the above formulae, $X^5$ each independently represents a single bond or a 2 to 10 valent organic group. $X^5$ in compounds represented by formulae (B1) and (B2) is interpreted as a linker connecting a perfluoropolyether moiety (Rf-PFPE moiety or -PFPE- moiety) which mainly provides, e.g., water-repellency and surface lubricity, and a silane moiety (i.e., —$SiR^1_nR^2_{3-n}$) which provides binding ability to a substrate. Thus, $X^5$ may be any organic group as long as compounds represented by formulae (B1) and (B2) can be stably present.

In the above formulae, β represents an integer of 1 to 9 and β' represents an integer of 1 to 9. The integers represented by β and β' are determined in accordance with the valence of $X^5$. In formula (B1), the sum of β and β' is equal to the valence of $X^5$. For example, if $X^5$ represents a 10-valent organic group, the sum of β and β' is 10; for example, a case where β is 9 and β' is 1, β is 5 and β' is 5, or β is 1 and β' is 9, can be considered. If $X^5$ is a divalent organic group, β and β' each are 1. In formula (B2), the value of β is obtained by subtracting 1 from the valence of $X^5$.

$X^5$ preferably represents a 2 to 7 valent organic group, more preferably a 2 to 4 valent organic group, and further preferably a divalent organic group.

In an embodiment, $X^5$ represents a 2 to 4 valent organic group; β represents an integer of 1 to 3; and β' represents 1.

In another embodiment, $X^5$ represents a divalent organic group; β represents 1; and β' represents 1. In this case, formulae (B1) and (B2) are represented by the following formulae (B1') and (B2'), respectively.

[Formula 6]

(B1')

(B2')

In the above formulae, $X^7$ each independently represents a single bond or a 2 to 10 valent organic group. $X^7$ in compounds represented by formulae (C1) and (C2) is interpreted as a linker connecting a perfluoropolyether moiety (Rf-PFPE moiety or -PFPE- moiety) which mainly provides, e.g., water-repellency and surface lubricity, and a silane moiety (i.e., —SiR$^a_k$R$^b_l$R$^c_m$ group) which provides binding ability to a substrate. Thus, X$^7$ may be any organic group as long as compounds represented by formulae (C1) and (C2) can be stably present.

In the above formulae, γ represents an integer of 1 to 9 and γ' represents an integer of 1 to 9. The integers represented by γ and γ' are determined in accordance with the valence of X$^7$. In formula (C1), the sum of γ and γ' is equal to the valence of X$^7$. For example, if X$^7$ represents a 10 valent organic group, the sum of γ and γ' is 10; for example, a case where γ is 9 and γ' is 1; γ is 5 and γ' is 5 or γ is 1 and γ' is 9, can be considered. If X$^7$ is a divalent organic group, γ and γ' each are 1. In formula (C2), the value of γ is obtained by subtracting 1 from the valence of X$^7$.

X$^7$ represents preferably 2 to 7 valent organic group, more preferably 2 to 4 valent organic group, and further preferably a divalent organic group.

In an embodiment, X$^7$ represents a 2 to 4 valent organic group; γ represents an integer of 1 to 3 and γ' represents 1.

In another embodiment, X$^7$ represents a divalent organic group; γ represents 1 and γ' represents 1. In this case, formulae (C1) and (C2) are represented by the following formulae (C1') and (C2'), respectively.

[Formula 7]

   (C1')

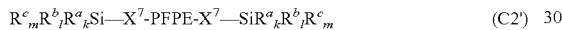   (C2')

In the above formulae, X$^9$ each independently represents a single bond or a 2 to 10 valent organic group. X$^9$ in compounds represented by formulae (D1) and (D2) is interpreted as a linker connecting a perfluoropolyether moiety (i.e., Rf-PFPE moiety or -PFPE- moiety) which mainly provides, e.g., water-repellency and surface lubricity, and a moiety (i.e., a group enclosed in parentheses attached with δ) providing binding ability to a substrate. Thus, X$^9$ may be any organic group as long as the compounds represented by formulae (D1) and (D2) can be stably present.

In the above formulae, δ represents an integer of 1 to 9 and δ' represents an integer of 1 to 9. The integers represented by δ and δ' can vary depending on the valence of X$^9$. In formula (D1), the sum of δ and δ' is equal to as the valence of X$^9$. For example, if X$^9$ is a 10 valent organic group, the sum of δ and δ' is 10; for example, a case where δ is 9 and δ' is 1; δ is 5 and δ' is 5, or δ is 1 and δ' is 9, can be considered. If X$^9$ is a divalent organic group, δ and δ' each are 1. In formula (D2), the value of δ is obtained by subtracting 1 from the valence of X$^9$ X$^9$ preferably represents a 2 to 7 valent organic group, more preferably a 2 to 4 valent organic group, and further preferably a divalent organic group.

In an embodiment, X$^9$ represents a 2 to 4 valent organic group; δ represents an integer of 1 to 3; and δ' represents 1.

In another embodiment, X$^9$ represents a divalent organic group; δ represents 1; and δ' represents 1. In this case, formulae (D1) and (D2) are represented by the following formulae (D1') and (D2').

[Formula 8]

   (D1')

   (D2')

In the above formulae, X$^3$ each independently represents a single bond or a 2 to 10 valent organic group. X$^3$ in compounds represented by formulae (E1) and (E2) is interpreted as a linker, connecting a perfluoropolyether moiety (i.e., Rf-PFPE moiety or -PFPE- moiety) which mainly provides, e.g., water-repellency and surface lubricity, and a moiety (i.e., group A) providing binding ability to a substrate. Thus, X$^3$ may be any organic group as long as the compounds represented by formulae (E1) and (E2) can be stably present.

In the above formulae, ε represents an integer of 1 to and ε' represents an integer of 1 to 9. The integers represented by ε and ε' can vary depending on the valence of X$^3$. In formula (E1), the sum of ε and ε' is equal to the valence of X$^3$. For example, if X$^3$ represents a 10 valent organic group, the sum of ε and ε' is 10; for example, a case where ε is 9 and ε' is 1; ε is 5 and ε' is 5, or ε is 1 and ε' is 9 can be considered. If X$^3$ is a divalent organic group, ε and ε' each are 1. In formula (E2), the value of ε is obtained by subtracting 1 from the valence of X$^9$.

X$^3$ preferably represents a 2 to 7 valent organic group, more preferably a 2 to 4 valent organic group and further preferably a divalent organic group.

In an embodiment, X$^3$ represents a 2 to 4 valent organic group; ε represents an integer of 1 3; and ε' represents 1.

In another embodiment, X$^3$ represents a divalent organic group; ε represents 1; and ε' represents 1. In this case, formulae (E1) and (E2) are represented by the following formulae (E1') and (E2').

[Formula 9]

   (E1')

   (E2')

In a preferable embodiment, X$^1$, X$^3$, X$^5$, X$^7$ and X$^9$, although they are not limited, may each independently represent, for example, a divalent group represented by the following formula:

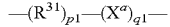

wherein

R$^{31}$ represents a single bond, —(CH$_2$)$_{s'}$— or o-, m- or p-phenylene group and preferably —(CH$_2$)$_{s'}$—, wherein s' represents an integer of 1 to 20, preferably 1 to 6, more preferably 1 to 3 and still further preferably 1 or 2, X$^a$ represents —(X$^b$)$_{l'}$—, wherein X$^b$ each independently in each occurrence represents a group selected from the group consisting of —O—, —S—, o-, a m- or p-phenylene group, —C(O)O—, —Si (R$^{33}$)$_2$—, —(Si(R$^{33}$)$_2$O)$_{m''}$—Si(R$^{33}$)$_2$—, —CONR$^{34}$—, —O—CONR$^{34}$—, —NR$^{34}$— and —(CH$_2$)$_{n'}$—, wherein R$^{33}$ each independently in each occurrence represents a phenyl group, a C$_{1-6}$ alkyl group or a C$_{1-6}$ alkoxy group, preferably a phenyl group or a C$_{1-6}$ alkyl group, and more preferably a methyl group, R$^{34}$ each independently in each occurrence represents a hydrogen atom, a phenyl group or a C$_{1-6}$ alkyl group (preferably a methyl group), m" each independently in each occurrence represents an integer of 1 to 100 and preferably an integer of 1 to 20, n' each independently in each occurrence represents an integer of 1 to 20, preferably an integer of 1 to 6, and more preferably an integer of 1 to 3, l' represents an integer of 1 to 10, preferably an integer of 1 to 5, and more preferably an integer of 1 to 3, and p1 represents 0 or 1, and q1 represents 0 or 1;

herein, at least one of p1 and q1 represents 1 and the repeating units enclosed in parentheses attached with p1 or q1 may be present in any order; and $R^{31}$ and $X^a$ (typically, hydrogen atoms of $R^{31}$ and $X^a$) are optionally substituted with at least one substituent selected from a fluorine atom, a $C_{1-3}$ alkyl group and a $C_{1-3}$ fluoroalkyl group.

Preferably, $X^1$, $X^3$, $X^5$, $X^7$ and $X^9$ each independently represent —$(R^{31})_{p1}$—$(X^a)_{q1}$—$R^{32}$—. $R^{32}$ represents a single bond, —$(CH_2)_{t'}$— or o-, m- or p-phenylene group, and preferably —$(CH_2)_{t'}$, wherein t' represents an integer of 1 to 20, preferably an integer of 2 to 6, and more preferably an integer of 2 or 3. $R^{32}$ (typically, a hydrogen atom of $R^{32}$) herein is optionally substituted with at least one substituent selected from a fluorine atom, a $C_{1-3}$ alkyl group and a $C_{1-3}$ fluoroalkyl group.

Preferably, $X^1$, $X^3$, $X^5$, $X^7$ and $X^9$ may each independently represent a $C_{1-20}$ alkylene group,
—$R^{31}$—$X^c$—$R^{32}$— or
—$X^d$—$R^{32}$—
wherein $R^{31}$ and $R^{32}$ are the same as defined above.

More preferably, $X^1$, $X^3$, $X^5$, $X^7$ and $X^9$ each independently represent
a $C_{1-20}$ alkylene group,
—$(CH_2)_{s'}$—$X^c$—,
—$(CH_2)_{s'}$—$X^c$—$(CH_2)_{t'}$—
—$X^d$— or
—$X^d$—$(CH_2)_{t'}$—
wherein s' and t' are the same as defined above.

In the above formulae, $X^c$ represents
—O—,
—S—,
—C(O) O—,
—$CONR^{34}$—,
—O—$CONR^{34}$—,
—$Si(R^{33})_2$—,
—$(Si(R^{33})_2O)_{m''}$—$Si(R^{33})_2$—,
—O—$(CH_2)_{u'}$—$(Si(R^{33})_2O)_{m''}$—$Si(R^{33})_2$—,
—O—$(CH_2)_{u'}$—$Si(R^{33})_2$—O—$Si(R^{33})_2$—$CH_2CH_2$—Si$(R^{33})_2$—O—$Si(R^{33})_2$—,
—O—$(CH_2)_{u'}$—$Si(OCH_3)_2OSi(OCH_3)_2$—,
—$CONR^{34}$—$(CH_2)_{u'}$—$(Si(R^{33})_2O)_{m''}$—$Si(R^{33})_2$—,
—$CONR^{34}$—$(CH_2)_{u'}$—$N(R^{34})$—, or
—$CONR^{34}$-(o-, m- or p-phenylene)-$Si(R^{33})_2$—,
wherein $R^{33}$, $R^{34}$ and m" are the same as defined above, u' represents an integer of 1 to 20, preferably an integer of 2 to 6, more preferably an integer of 2 or 3; and $X^c$ preferably represents —O—.

In the above formulae, $X^d$ represents
—S—,
—C(O)O—,
—$CONR^{34}$—,
—$CONR^{34}$—$(CH_2)_{u'}$—$(Si(R^{33})_2O)_{m''}$—$Si(R^{33})_2$—,
—$CONR^{34}$—$(CH_2)_{u'}$—$N(R^{34})$—, or
—$CONR^{34}$-(o-, m- or p-phenylene)-$Si(R^{33})_2$—,
wherein individual reference symbols are the same as defined above.

More preferably, $X^1$, $X^3$, $X^5$, $X^7$ and $X^9$ may each independently represent
a $C_{1-20}$ alkylene group,
—$(CH_2)_{s'}$—$X^c$—$(CH_2)_{t'}$— or
—$X^d$—$(CH_2)_{t'}$—,
wherein individual reference symbols are the same as defined above.

Still more preferably, $X^1$, $X^3$, $X^5$, $X^7$ and $X^9$ each independently represent
a $C_{1-20}$ alkylene group,
—$(CH_2)_{s'}$—O—$(CH_2)_{t'}$—,
—$(CH_2)_{s'}$—$(Si(R^{33})_2O)_{m''}$—$Si(R^{33})_2$—$(CH_2)_{t'}$—,
—$(CH_2)_{s'}$—O—$(CH_2)_{u'}$—$(Si(R^{33})_2O)_{m''}$—$Si(R^{33})_2$—$(CH_2)_{t'}$—, or
—$(CH_2)_{s'}$—O—$(CH_2)_{t'}$—$Si(R^{33})_2$—$(CH_2)_{u'}$—$Si(R^{33})_2$—$(C_vH_{2v})$—
wherein $R^{33}$, m", s', t' and u' are the same as defined above; v represents an integer of 1 to 20, preferably an integer of 2 to 6 and more preferably an integer of 2 or 3.

In the above formula, —$(C_vH_{2v})$— may be linear or branched and may be, for example, —$CH_2CH_2$—, —$CH_2CH_2CH_2$—, —$CH(CH_3)$— or —$CH(CH_3)CH_2$—.

Groups represented by $X^1$, $X^3$, $X^5$, $X^7$ and $X^9$ each independently are optionally substituted with at least one substituent selected from a fluorine atom, a $C_{1-3}$ alkyl group and a $C_{1-3}$ fluoroalkyl group (preferably a $C_{1-3}$ perfluoroalkyl group).

In an embodiment, groups represented by $X^1$, $X^3$, $X^5$, $X^7$ and $X^9$ may be each independently groups except a —O—$C_{1-6}$ alkylene group.

In another embodiment, examples of the groups represented by $X^1$, $X^3$, $X^5$, $X^7$ and $X^9$, include those mentioned below:

[Formula 10]

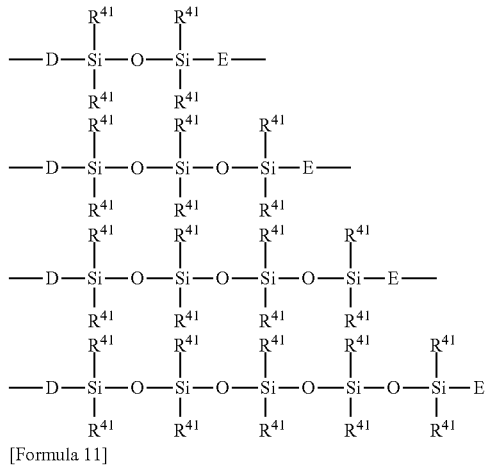

[Formula 11]

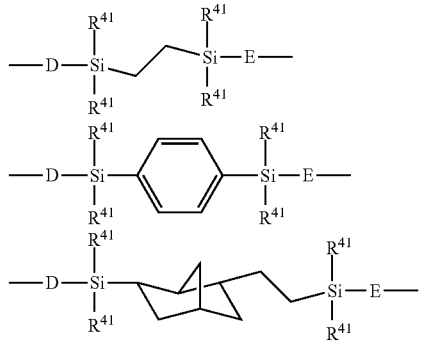

wherein $R^{41}$ each independently represents a hydrogen atom, a phenyl group, an alkyl group having 1 to 6 carbon atoms or a $C_{1-6}$ alkoxy group, and preferably a methyl group; and D represents a group selected from
—$CH_2O(CH_2)_2$—,
—$CH_2O(CH_2)_3$—,
—$CF_2O(CH_2)_3$—,
—$(CH_2)_2$—, —$(CH_2)_3$—,
—$(CH_2)_4$—,
—CONH—$(CH_2)_3$—,
—CON($CH_3$)—$(CH_2)_3$—,
—CON(Ph)-$(CH_2)_3$—, (wherein Ph stands for phenyl) and a group represented by the following formula:

[Formula 12]

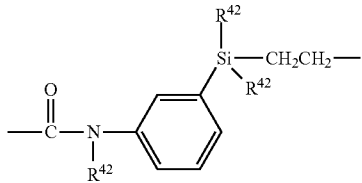

wherein $R^{42}$ each independently represents a hydrogen atom, a $C_{1-6}$ alkyl group or a $C_{1-6}$ alkoxy group, preferably a methyl group or a methoxy group, and more preferably a methyl group, E represents —$(CH_2)_n$— (n represents an integer of 2 to 6), and D binds to a molecular backbone, PFPE, and E binds to a group opposite to PFPE.

Specific examples of $X^1$, $X^3$, $X^5$, $X^7$ and $X^9$ include, for example,
—$CH_2O(CH_2)_2$—,
—$CH_2O(CH_2)_3$—,
—$CH_2O(CH_2)_6$—,
—$CH_2O(CH_2)_3Si(CH_3)_2OSi(CH_3)_2$ $(CH_2)_2$—,
—$CH_2O(CH_2)_3Si(CH_3)_2OSi(CH_3)_2OSi(CH_3)_2$ $(CH_2)_2$—,
—$CH_2O(CH_2)_3Si(CH_3)_2O(Si(CH_3)_2O)_2Si(CH_3)_2$ $(CH_2)_2$—,
—$CH_2O(CH_2)_3Si(CH_3)_2O(Si(CH_3)_2O)_3Si(CH_3)_2(CH_2)_2$—,
—$CH_2O(CH_2)_3Si(CH_3)_2O(Si(CH_3)_2O)_{10}Si(CH_3)_2(CH_2)_2$—,
—$CH_2O(CH_2)_3Si(CH_3)_2O(Si(CH_3)_2O)_{20}Si(CH_3)_2(CH_2)_2$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,
—$CH_2OCH_2CF_2CF_2OCF(CF_3)CF_2OCF_2$—,
—$CH_2OCH_2CF_2CF_2OCF(CF_3)CF_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_2OCF(CF_3)CF_2OCF_2$—,
—$CH_2OCH_2CHFCF_2OCF(CF_3)CF_2OCF_2CF_2$—,
—$CH_2OCH_2CHFCF_2OCF(CF_3)CF_2OCF_2CF_2CF_2$—,
—$CH_2OCH_2(CH_2)_2CH_2Si(OCH_3)_2OSi(OCH_3)_2(CH_2)_2Si(OCH_3)_2OSi(OCH_3)_2(CH_2)_2$—,
—$CH_2OCH_2CH_2CH_2Si(OCH_3)_2OSi(OCH_3)_2(CH_2)_3$—,
—$CH_2OCH_2CH_2CH_2Si(OCH_2CH_3)_2OSi(OCH_2CH_3)_2(CH_2)_3$—,
—$CH_2OCH_2CH_2CH_2Si(OCH_3)_2OSi(OCH_3)_2(CH_2)_2$—,
—$CH_2OCH_2CH_2CH_2Si(OCH_2CH_3)_2OSi(OCH_2CH_3)_2(CH_2)_2$—,
—$(CH_2)_2$—,
—$(CH_2)_3$—,
$(CH_2)_4$—,
$(CH_2)_5$—,
$(CH_2)_6$—,
—CONH—$(CH_2)_3$—,
—CON($CH_3$)—$(CH_2)_3$—,
—CON(Ph)-$(CH_2)_3$— (wherein Ph stands for phenyl),
—CONH—$(CH_2)_6$—,
—CON($CH_3$)—$(CH_2)_6$—,
—CON(Ph)-$(CH_2)_6$— (wherein Ph stands for phenyl),
—CONH—$(CH_2)_2NH(CH_2)_3$—,
—CONH—$(CH_2)_6NH(CH_2)_3$—,
—$CH_2O$—CONH—$(CH_2)_3$—,
—$CH_2O$—CONH—$(CH_2)_6$—,
—S—$(CH_2)_3$—,
$(CH_2)_2S(CH_2)_3$—,
—CONH—$(CH_2)_3Si(CH_3)_2OSi(CH_3)_2$ $(CH_2)_2$—,
—CONH—$(CH_2)_3Si(CH_3)_2OSi(CH_3)_2OSi(CH_3)_2$ $(CH_2)_2$—,
—CONH—$(CH_2)_3Si(CH_3)_2O(Si(CH_3)_2O)_2Si(CH_3)_2(CH_2)_2$—,
—CONH—$(CH_2)_3Si(CH_3)_2O(Si(CH_3)_2O)_3Si(CH_3)_2$ $(CH_2)_2$—,
—CONH—$(CH_2)_3Si(CH_3)_2O(Si(CH_3)_2O)_{10}Si(CH_3)_2$ $(CH_2)_2$—,
—CONH—$(CH_2)_3Si(CH_3)_2O(Si(CH_3)_2O)_{20}Si(CH_3)_2$ $(CH_2)_2$—,
—$C(O)O$—$(CH_2)_3$—,
—$C(O)O$—$(CH_2)_6$—,
—$CH_2$—O—$(CH_2)_3$—$Si(CH_3)_2$—$(CH_2)_2$—$Si(CH_3)_2$—$(CH_2)_2$—,
—$CH_2$—O—$(CH_2)_3$—$Si(CH_3)_2$—$(CH_2)_2$—$Si(CH_3)_2$—CH$(CH_3)$—,
—$CH_2$—O—$(CH_2)_3$—$Si(CH_3)_2$—$(CH_2)_2$—$Si(CH_3)_2$—$(CH_2)_3$—,
—$CH_2$—O—$(CH_2)_3$—$Si(CH_3)_2$—$(CH_2)_2$—$Si(CH_2)_2$—CH$(CH_3)$—$CH_2$—,
—$OCH_2$—,
—$O(CH_2)_3$—,
—$OCFHCF_2$—,
and a group represented by the following formula:

[Formula 13]

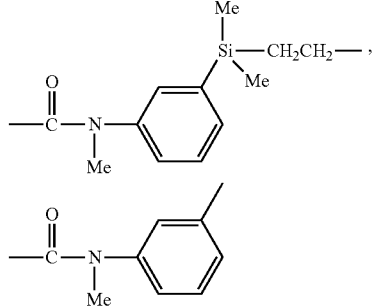

In another embodiment, $X^1$, $X^3$, $X^5$, $X^7$ and $X^9$ each independently represent a group represented by the formula: —$(R^{16})_x$—$(CFR^{17})_y$—$(CH_2)_z$—, wherein, x, y and z each independently represent an integer of 0 to 10 and the sum of x, y and z is 1 or more, the repeating units enclosed in parentheses may be present in any order.

In the above formula, $R^{16}$ each independently in each occurrence represents an oxygen atom, phenylene, carbazolylene, —$NR^{26}$— (wherein $R^{26}$ represents a hydrogen atom or an organic group) or a divalent organic group. Preferably, $R^{16}$ represents an oxygen atom or a divalent polar group.

Examples of the "divalent polar group" include, but are not limited to, —C(O)—, —C(=NR$^{27}$)— and —C(O)NR$^{27}$— (wherein R$^{27}$ represents a hydrogen atom or a lower alkyl group). The "lower alkyl group" is, for example, an alkyl group having 1 to 6 carbon atoms, such as methyl, ethyl and n-propyl which are optionally substituted with one or more fluorine atoms.

In the above formulae, R$^{17}$ each independently in each occurrence represents a hydrogen atom, a fluorine atom or a lower fluoroalkyl group, and preferably a fluorine atom. The "lower fluoroalkyl group" is, for example, a fluoroalkyl group having 1 to 6 carbon atoms, preferably 1 to 3 carbon atoms, preferably a perfluoroalkyl group having to 3 carbon atoms, more preferably a trifluoromethyl group or pentafluoroethyl group, and further preferably a trifluoromethyl group.

In another embodiment, examples of the groups represented by X$^1$, X$^3$, X$^5$, X$^7$ and X$^9$, the following groups are mentioned:

[Formula 14]

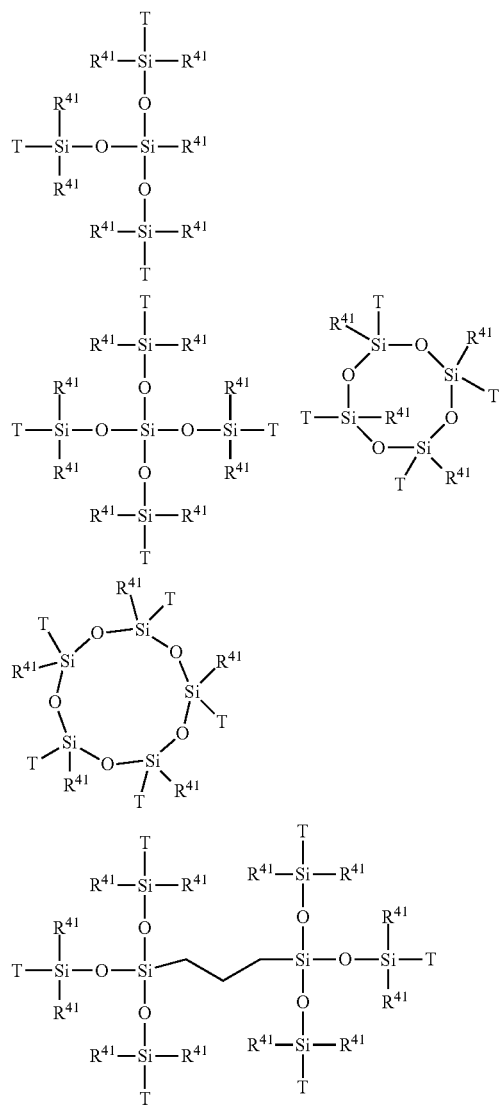

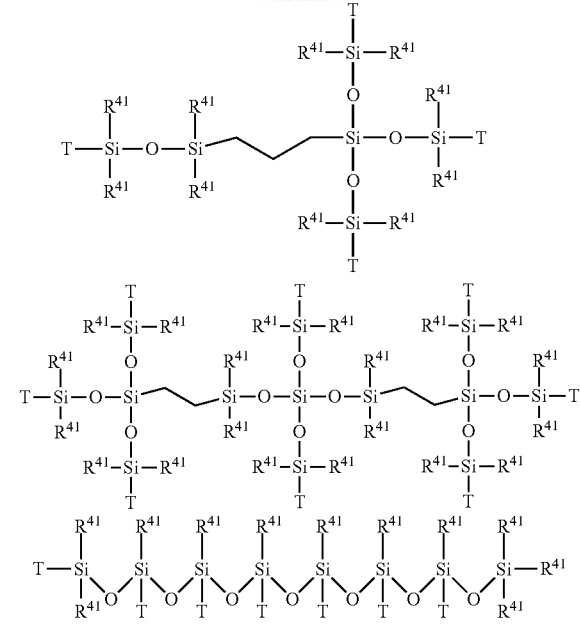

wherein

R$^{41}$ each independently represents a hydrogen atom, a phenyl group, an alkyl group having 1 to 6 carbon atoms or a C$_{1-6}$ alkoxy group, and preferably a methyl group;

in a group represented by X$^1$, some of the groups represented by T represent the following groups to be bound to PFPE of the molecular backbone:
—CH$_2$O(CH$_2$)$_2$—,
—CH$_2$O(CH$_2$)$_3$—,
—CF$_2$O(CH$_2$)$_3$—,
—(CH$_2$)$_2$—,
—(CH$_2$)$_3$—,
—(CH$_2$)$_4$—,
—CONH—(CH$_2$)$_3$—,
—CON(CH$_3$)—(CH$_2$)$_3$—,
—CON(Ph)-(CH$_2$)$_3$— (wherein Ph stands for phenyl) or
a group represented by:

[Formula 15]

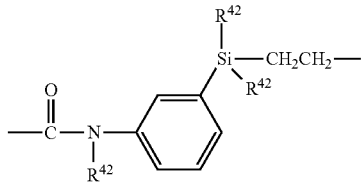

wherein R$^{42}$ each independently represents a hydrogen atom, a C$_{1-6}$ alkyl group or a C$_{1-6}$ alkoxy group, preferably a methyl group or a methoxy group, and more preferably a methyl group;

some of the other groups represented by T, each represent a carbon atom in groups (that is, formula (A1), (A2), (D1) and (D2)) opposite to PFPE of the molecular backbone, and a Si atom to be bound to A in the groups represented by the following formulae (B1), (B2), (C1) and (C2) and —(CH$_2$)$_{n''}$— ("n" represents an integer of 2 to 6) in groups represented by (E1) and (E2)); and the remaining groups represented by T, if present, each independently represent a methyl group, a phenyl group, a $C_{1-6}$ alkoxy group, a radical scavenging group or a UV absorbing group.

The radical scavenging group is not limited as long as it can capture a radical generated by light irradiation, and, for example, residues of a benzophenone, a benzotriazole, a benzoate, a phenyl salicylate, crotonic acid, a malonate, an organo-acrylate, a hindered amine, a hindered phenol or a triazine, is mentioned.

The UV absorbing group is not limited as long as it can absorb ultraviolet rays, and, for example, a residue of a benzotriazole, a hydroxybenzophenone, an ester of a substituted and unsubstituted benzoic acid or salicylic acid compound, an acrylate or an alkoxy cinnamate, an oxamide, an oxanilide, a benzoxazinone or a benzoxazole, is mentioned.

In a preferable embodiment, as a preferable radical scavenging group or UV absorbing group, the groups represented by the following formulae are mentioned.

[Formula 16]

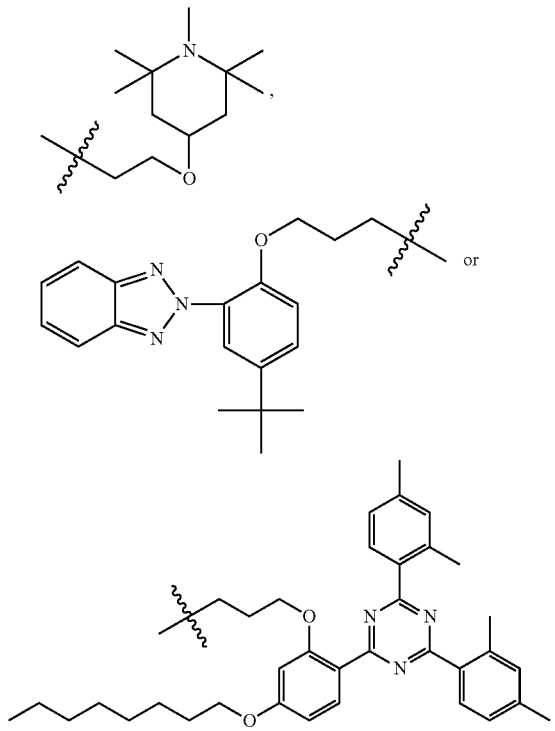

In this embodiment, $X^1$, $X^3$, $X^5$, $X^7$ and $X^9$ each independently may represent a 3 to 10 valent organic group.

The number average molecular weight of the reactive perfluoropolyether group-containing silane compound to be used in the present invention is preferably 1,000 to 30,000, preferably 1,500 to 30,000, and more preferably 2,000 to 10,000.

The degree of dispersion (weight average molecular weight/number average molecular weight (Mw/Mn)) of the reactive perfluoropolyether group-containing silane compound to be used in the present invention, although it is not limited, may be preferably 1.0 or more and 3.0 or less, more preferably 1.0 or more and 2.0 or less, and further preferably 1.0 to 1.5. If the degree of dispersion is controlled to be 3.0 or less, the uniformity of a film can be more improved. As the degree of dispersion decreases, the uniformity of the film is (more) improved.

In the reactive perfluoropolyether group-containing silane compound to be used in the present invention, the number average molecular weight of a perfluoropolyether moiety (Rf-PFPE-moiety or -PFPE-moiety), although it is not limited, is preferably 500 to 30,000, preferably 1,000 to 30,000, and more preferably 1,500 to 10,000.

In a preferable embodiment, the reactive perfluoropolyether group-containing compound may be a compound represented by the following formula (A1), (A2), (B1), (B2), (C1), (C2), (D1) or (D2), a so-called reactive perfluoropolyether group-containing silane compound. If the silane compound is used, cycle characteristics can be (more) improved. In addition, adhesion of the film formed of the reactive perfluoropolyether group-containing silane compound to an electrode can be improved.

In an embodiment, the reactive perfluoropolyether group-containing compound is a compound represented by formula (A1) or (A2).

In an embodiment, the reactive perfluoropolyether group-containing compound is a compound represented by formula (B1) or (B2).

In an embodiment, the reactive perfluoropolyether group-containing compound is a compound represented by formula (C1) or (C2).

In an embodiment, the reactive perfluoropolyether group-containing compound is a compound represented by formula (D1) or (D2).

In an embodiment, the reactive perfluoropolyether group-containing compound is a compound represented by formula (E1) or (E2).

Compounds represented by formulae (A1), (A2), (B1), (B2), (C1), (C2), (D1), (D2), (E1) and (E2) may be produced by methods known in the art.

As a method for forming a coating layer of a perfluoropolyether group-containing compound on the surface of an electrode, for example, there is a method of forming a coating layer by forming a film of a reactive perfluoropolyether group-containing compound on an electrode material, and optionally subjecting the film to a post-treatment.

A film of a perfluoropolyether group-containing compound may be formed on an electrode material by a method of applying the reactive perfluoropolyether group-containing compound to a surface of the electrode material so as to cover the surface. As the coating method, although it is not limited, e.g., a wet coating method and a dry coating method may be used.

The reactive perfluoropolyether group-containing compound may be directly applied or as a component of a composition prepared by mixing it with other components such as a solvent.

Examples of the solvent to be used in the composition include a $C_{5-12}$ perfluoroaliphatic hydrocarbon (for example, perfluorohexane, perfluoromethylcyclohexane and perfluoro-1,3-dimethylcyclohexane); a polyfluoroaromatic hydrocarbon (for example, bis(trifluoromethyl)benzene); a polyfluoroaliphatic hydrocarbon (for example, $C_6F_{13}CH_2CH_3$ (for example, ASAHI KLIN (registered trade mark) AC-6000, manufactured by Asahi Glass Co., Ltd., and 1,1,2,2,3,3,4-heptafluorocyclopentane (for example, ZEORORA-H (registered trade mark) manufactured by ZEON CORPORATION)); a hydrofluorocarbon (HFC) (for example, 1,1,1,3,3-pentafluorobutane (HFC-365mfc)); a hydrochlorofluorocarbon (for example, HCFC-225 (ASAHI KLIN (registered trade mark) AK225)); and a hydrofluoroether (HFE) (for example, an alkyl perfluoroalkylether (a perfluoroalkyl group and an alkyl group may be linear or branched) such as perfluoropropyl methyl ether ($C_3F_7OCH_3$) (for example, Novec (trade name) 7000, manufactured by SUMITOMO 3M), perfluorobutyl methyl ether ($C_4F_9OCH_3$) (for example, Novec (trade name) 7100, manufactured by SUMITOMO 3M), perfluorobutyl ethyl ether ($C_4F_9OC_2H_5$) (for example, Novec (trade name) 7200, manufactured by SUMITOMO 3M), perfluorohexyl methyl ether ($C_2F_5CF(OCH_3)C_3F_7$) (for example, Novec (trade name) 7300 manufactured by SUMITOMO 3M) or $CF_3CH_2OCF_2CHF_2$ (for example, ASAHI KLIN (registered trade mark) AE-3000, manufactured by Asahi Glass Co., Ltd.), 1,2-dichloro-1,3,3,3-tetrafluoro-1-propene (for example, Vertrel (registered trade mark) Sion, manufactured by Du Pont-Mitsui Fluorochemicals Co., Ltd.). These solvents may be used alone or as a mixture prepared by mixing two or more solvents in combination. To control, e.g., solubility of a reactive perfluoropolyether group-containing silane compound, another solvent may be mixed.

The composition may contain other components. Examples of the components include, but are not limited to, a catalyst.

Examples of the catalyst include an acid (for example, acetic acid, trifluoroacetic acid), a base (for example, ammonia, triethylamine, diethylamine) and a transition metal (for example, Ti, Ni, Sn).

The catalyst promotes hydrolysis and dehydration condensation of a reactive perfluoropolyether group-containing silane compound to accelerate formation of the coating layer.

Examples of the wet coating method include dip coating, spin coating, flow coating, spray coating, roll coating, gravure coating and an analogous method.

Examples of the dry coating method include a PVD method, a CVD method and an analogous method. The PVD method refers to a method of forming a thin film by heating a solid raw material in vacuum (vacuum deposition) or irradiating a solid raw material with high speed electrons and ions, thereby applying physical energy to atoms present in a solid surface to vaporize the atoms, which are allowed to recouple on an electrode material. Examples of the PVD method include, but are not limited to, a deposition method (usually, vacuum deposition method) and sputtering. Examples of the deposition method (usually, vacuum deposition method) include resistance heating, electron beam, high-frequency heating using, e.g., microwave and ion beam depositions, and analogous methods. Examples of the CVD method include plasma-CVD, optical CVD and thermal CVD, and analogous methods. Of them, a PVD method is preferable, particularly a deposition method, for example resistance heating deposition or electron beam deposition, is preferable, and electron beam deposition is more preferable.

Coating may be carried out also by an atmospheric pressure plasma method.

Subsequently, the film is optionally subjected to post treatment. The post treatment, although it is not limited, may be e.g., heating, moisture supply or both of them.

The post treatment may be carried out for improving durability (by extension, improving cycle characteristics or storage stability of a lithium ion secondary battery) of the coating layer; however, it should be noted that post treatment is not an essential step. For example, the film after the reactive perfluoropolyether group-containing compound is applied thereto, may be just allowed to stand still.

In the manner as mentioned above, a coating layer, i.e., a film of the reactive perfluoropolyether group-containing compound, is formed on the electrode material.

The electrode of the present invention may be obtained by treating a surface of an electrode material with a reactive perfluoropolyether group-containing compound; or the electrode may be formed from a mixture of a raw material for forming an electrode material and a reactive perfluoropolyether group-containing compound.

The thickness of the coating layer, although it is not limited, preferably falls within the range of 0.1 to 50 nm, preferably 0.3 to 50 nm, more preferably 0.5 to 30 nm, and further preferably 1 to 10 nm. If the thickness is increased, contact between an electrode material and the electrolyte can be more effectively inhibited, with the result that the function or electrical characteristics of an electrochemical device can be improved. In contrast, if the thickness is reduced, the distance between an active material and the electrolyte can be reduced, with the result that capacity can be increased.

In a preferable embodiment, the coating layer is a monomolecular film. If the coating layer is a monomolecular film, a thinner and denser film can be obtained, with the result that not only improvement of electrical characteristics but also increase of capacity can be attained at a higher level.

The electrode of the present invention contains a compound having a perfluoropolyether group. Because of this, if the electrode is used in an electrochemical device, the cycle capacity retention rate of the electrochemical device is improved and the resistance increase rate thereof can be suppressed, and further, deterioration in performance during storage at a high temperature can be suppressed. Although the present invention is not constrained by any theory, the reason why the aforementioned effect can be obtained is considered that direct contact between an electrode material and an electrolytic solution can be suppressed by a compound having a perfluoropolyether group contained in the electrode of the present invention.

Electrode Material

The electrode material refers to a member constituting a main part of an electrode of an electrochemical device and ordinarily used in various electrochemical devices. The electrode material may be appropriately selected by those skilled in the art in accordance with the type of electrochemical device. For example, in an alkali metal ion battery, the electrode material may be an active material-containing portion containing an active material (hereinafter, used for collectively referring to a positive electrode active material and a negative electrode active material). In an electric double-layer capacitor, the electrode material may be a portion forming an electric-double layer at the interface in contact with an electrolyte, for example, a portion containing carbon or graphite.

The electrode of the present invention may be used as either one of a positive electrode and a negative electrode in an electrochemical device. If the electrode of the present invention is used as the positive electrode, oxidative decomposition of an electrolytic solution can be suppressed, with the result that deterioration of the electrochemical device (battery) and decomposition of the structure of the positive electrode due to decomposition of the electrolytic solution can be suppressed. If the electrode of the present invention is used as the negative electrode, a solid/electrolyte interface (SEI) structure, which is formed at the interface between the electrode and the electrolytic solution, can be stabilized to allow lithium ions to satisfactorily move. As a result, an increase of resistance can be suppressed.

Since the electrode of the present invention contains a perfluoropolyether group-containing compound in the surface thereof, as mentioned above, if the electrode is used as a positive electrode and/or a negative electrode in an electrochemical device, satisfactory electrical characteristics and large capacity of the electrochemical device can be achieved.

<Electrochemical Device>

As mentioned above, the electrode of the present invention can be used in various electrochemical devices.

Accordingly, the present invention also provides electrochemical devices having the electrode of the present invention.

The electrochemical device refers to a device having at least a pair of electrodes and an electrolyte intervening between the pair of electrodes.

Examples of the electrochemical device include, but are not limited to, a battery, an electrochemical sensor, an electrochromic device, an electrochemical switching device, an electrolytic capacitor and an electrochemical capacitor.

The battery is not limited as long as it has electrodes and an electrolyte. Examples thereof include an alkali metal battery, an alkali metal ion battery, an alkaline earth metal ion battery, a radical battery, a solar cell and a fuel cell. In a preferable embodiment, as specific examples of the battery, an alkali metal battery, an alkali metal ion battery or an alkaline earth metal battery such as a lithium battery, a lithium ion battery, a sodium ion battery, a magnesium battery, a lithium air battery, a sodium-sulfur battery and a lithium-sulfur battery can be mentioned, and preferably a lithium ion battery can be mentioned. The battery may be a primary battery and a secondary battery, preferably an alkali metal ion secondary battery, and particularly, a lithium ion secondary battery.

The electrochemical sensor refers to a sensor, which is used for detecting or determining natural phenomena or mechanical, electromagnetic, thermal, acoustical and chemical properties of an artifact, or spatial information/timing information indicated by them, and which has an electrode(s) using an electrochemical principle and an electrolyte. Examples of the electrochemical sensor include an actuator, a humidity sensor, a gas-concentration sensor, an ion-concentration sensor and an odor sensor.

The electrochromic device refers to a device, which controls optical absorption in a reversible manner by application of voltage (or current), and which has an electrode(s) using an electrochemical reaction and an electrolyte. Examples of the electrochromic device include an electrochromic device electrically changing color.

The electrochemical switching device is not limited as long as it has an electrode(s) and an electrolyte. Examples thereof include an electrochemical transistor and a field effect transistor.

The electrolytic capacitor is not limited as long as it has an electrode(s) and an electrolyte. Examples thereof include an aluminum electrolytic capacitor and a tantalum electrolytic capacitor.

The electrochemical capacitor is not limited as long as it has an electrode(s) and an electrolyte. Examples thereof include an electric double layer capacitor, a redox capacitor and a hybrid capacitor such as a lithium ion capacitor.

In an embodiment, the electrochemical device of the present invention can be a device using the electrode of the present invention only as one of the electrodes. For example, the electrochemical device of the present invention can employ the electrode of the present invention only as a negative electrode or a positive electrode. In an embodiment, the electrochemical device of the present invention can employ the electrode of the present invention only as a positive electrode. In another embodiment, the electrochemical device of the present invention can employ the electrode of the present invention as both electrodes, i.e., a positive electrode and a negative electrode.

The electrochemical device of the present invention is not limited by the examples mentioned above as long as it is a device consisting of at least a pair of electrodes and an electrolyte intervening between the electrodes. Also, the electrochemical device of the present invention is satisfactory if the electrode of the present invention is used as at least one of the electrodes and other constituents may be the same as in a conventional electrochemical device unless otherwise specified.

<Alkali Metal Ion Secondary Battery>

Now, the electrochemical device of the present invention will be more specifically described by way of an alkali metal ion secondary battery as an example.

In an embodiment, the present invention provides an alkali metal ion secondary battery having the electrode of the present invention as at least one of the positive electrode and negative electrode and preferably a lithium ion secondary battery.

The alkali metal ion secondary battery of the present invention possibly has a general structure as an alkali metal ion secondary battery. For example, the alkali metal ion secondary battery of the present invention possibly has, e.g., a positive electrode, a negative electrode, a separator and an electrolytic solution in an exterior case. Also, the alkali metal ion secondary battery of the present invention further possibly has members except those mentioned above such as a positive electrode current collector tab, a negative electrode current collector tab and a battery cover, or a member for protecting the battery, such as an internal pressure release valve or a PTC element.

In the alkali metal ion secondary battery, an electrode material may be an active material-containing portion containing an active material (hereinafter, used for collectively referring to a positive electrode active material and a negative electrode active material). Typically, an electrode material may be constituted of an active material-containing portion and a current collector. In an embodiment, the active material-containing portion is present on the current collector in the form of a laminate.

Positive Electrode

The positive electrode has a positive electrode material containing an active material-containing portion containing a positive electrode active material. If the positive electrode is the electrode of the present invention, the positive electrode (further) has a perfluoropolyether group-containing compound on a surface of the positive electrode material.

The positive electrode active material is not limited as long as it can electrochemically absorb/desorb an alkali metal ion; preferably, for example, a substance containing an alkali metal and at least one transition metal. Specific examples thereof include an alkali metal-containing transition metal composite oxide and an alkali metal-containing transition metal phosphate compound. Of them, an alkali metal-containing transition metal composite oxide generating high voltage is particularly preferable as the positive electrode active material. Examples of the alkali metal ion include a lithium ion, a sodium ion and a potassium ion. In a preferable embodiment, the alkali metal ion may be a lithium ion. That is, in this embodiment, the alkali metal ion secondary battery refers to a lithium ion secondary battery.

Examples of the alkali metal-containing transition metal composite oxide include a lithium-manganese spinel composite oxide represented by formula:

$$M_a Mn_{2-b} M^1{}_b O_4$$

wherein M represents at least one metal selected from Li, Na and K; 0.9≤a; 0≤b≤1.5; $M^1$ is at least one metal selected from the group consisting of Fe, Co, Ni, Cu, Zn, Al, Sn, Cr, V, Ti, Mg, Ca, Sr, B, Ga, In, Si and Ge; a lithium-nickel composite oxide represented by formula:

$$MNi_{1-c}M^2{}_cO_2$$

wherein M is at least one meal selected from Li, Na and K; 0≤c≤0.5; $M^2$ represents at least one metal selected from the group consisting of Fe, Co, Mn, Cu, Zn, Al, Sn, Cr, V, Ti, Mg, Ca, Sr, B, Ga, In, Si and Ge; and, a lithium-cobalt composite oxide represented by formula:

$$MCo_{1-d}M^3{}_dO_2$$

wherein M is at least one meal selected from Li, Na and K; 0≤d≤0.5; $M^3$ represents at least one metal selected from the group consisting of Fe, Ni, Mn, Cu, Zn, Al, Sn, Cr, V, Ti, Mg, Ca, Sr, B, Ga, In, Si and Ge.

In the above, M is preferably at least one meal selected from Li, Na and K, more preferably Li or Na, and further preferably Li.

Of them, for the reason that an alkali metal ion secondary battery having a high energy density and a high power can be provided, $MCoO_2$, $MMnO_2$, $MNiO_2$, $MMn_2O_4$, $MNi_{0.8}Co_{0.15}Al_{0.05}O_2$ or $MNi_{1/3}Co_{1/3}Mn_{1/3}O_2$ is preferable.

Examples of other positive electrode active materials include $MFePO_4$, $MNi_{0.8}Co_{0.2}O_2$, $M_{1.2}Fe_{0.4}O_2$, $MNi_{0.5}Mn_{1.5}O_2$, $MV_3O_6$ and $M_2MnO_3$. Particularly, a positive electrode active material such as $M_2MnO_3$ and $MNi_{0.5}Mn_{1.5}O_2$ is preferable because even if the lithium ion secondary battery using such a positive electrode is operated at a voltage beyond 4.4 V, e.g., a voltage of, 4.6 V or more, its crystal structure is not broken. Accordingly, an electrochemical device, such as a lithium ion secondary battery, having the positive electrode of the present invention using a positive electrode material containing a positive electrode active material as mentioned above, is preferable because even if it is stored at a high temperature, the residual capacity of the battery rarely decreases and the resistance increase rate rarely changes, and even if it is operated at a high voltage, the battery performance rarely deteriorates.

Negative Electrode

The negative electrode has a negative electrode material containing an active material-containing portion containing a negative electrode active material. If the negative electrode is the electrode of the present invention, the negative electrode (further) has a perfluoropolyether group-containing compound on a surface of the negative electrode material.

Examples of the negative electrode active material that can be mentioned include thermolysis products of an organic substance in various thermal decomposition conditions, carbonaceous materials that can absorb/desorb alkali metals, preferably lithium, such as artificial graphite and natural graphite, metal oxide materials that can absorb/desorb an alkali metal, such as stannum oxide and silicon oxide; alkali metals; alkali metal alloys; and alkali metal-containing metal composite oxide materials. These negative electrode active materials may be used as a mixture (two or more).

As the carbonaceous material that can absorb/desorb an alkali metal, artificial graphite or purified natural graphite produced by treating graphitizable pitch, which can be obtained from various materials, at a high temperature, or a material obtained by treating the surface of graphite with pitch or an organic substance except the pitch, followed by carbonizing it, is preferable; and a material selected from carbonaceous materials obtained by subjecting natural graphite, artificial graphite, an artificial carbonaceous material and an artificial graphite substance once or more to a heat treatment performed in the range of 400 to 3200° C.; a carbonaceous material where a negative electrode active material layer is constituted of carbonaceous substances having at least two types or more different crystallinities and/or having an interface at which the different crystallinity carbonaceous substances are in contact with each other; and a carbonaceous material where a negative electrode active material layer has an interface at which at least two types of carbonaceous substances different in orientation are in contact with each other, is more preferable because the initial irreversible capacity, high current density charge and discharge characteristics are well balanced. These carbon materials may be used alone or in combination (two types or more can be used in any combination and any ratio).

Examples of the carbonaceous material obtained by subjecting an artificial carbonaceous material and an artificial graphite material, once or more, to a heat treatment performed in the range of 400 to 3200° C. include coal-based coke, petroleum coke, coal pitch, petroleum-based pitch, and products obtained by oxidation treatment of these; needle coke, pitch coke and carbon agents obtained by partial graphitization of these; furnace black, acetylene black, a thermolysis product of an organic substance such as a pitch-based carbon fiber; organic substances that can be carbonized and carbides of these or solutions of the organic substances that can be carbonized dissolved in low molecular weight organic solvents such as benzene, toluene, xylene, quinoline and n-hexane, and carbides of these.

As the metal material to be used as the negative electrode active material, a single alkali metal, a single metal or an alloy forming an alkali metal alloy or oxides, carbides, nitrides, silicides, sulfides or phosphides of these may be mentioned, as long as it can absorb/desorb an alkali metal. As the single metal or alloy forming an alkali metal alloy, a material containing a metal/metalloid element belonging to the 13rd and 14th families is preferable, and a single metal such as aluminum, silicon and stannum (hereinafter, simply referred to as "predetermined metal elements") and alloys or compounds containing these atomic elements are more preferable. These may be used alone or in any combination of two or more at any ratio.

Examples of a negative electrode active material having at least one atomic element selected from the predetermined metal elements include a single metal of any one of the predetermined metal elements; an alloy formed of two types or more predetermined metal elements; an alloy formed of a single or two types or more predetermined metal elements and a single or two types or more metal elements except the predetermined metal elements; (and) a compound containing a single or two types or more predetermined metal elements; and composite compounds such as an oxide, a carbide, a nitride, a silicide, a sulfide or a phosphide of the compound. If a single metal substance, an alloy or a metal compound as mentioned above is used as the negative electrode active substance, the capacity of the resultant battery can be increased.

In addition, compounds obtained by complexly binding these composite compounds to several elements such as single metals, an alloy or nonmetal elements, are mentioned; more specifically, if silicon and stannum are used, alloys of these elements with a metal not serving as a negative electrode, can be used. For example, in the case of using stannum, a complicated compound containing 5 to 6 elements, more specifically, containing a metal serving as a negative electrode except stannum and silicon, a metal not serving as a negative electrode, and non-metal elements in combination, can be used.

More specifically, Si, $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_6Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), LiSiO or stannum, $SnSiO_3$, LiSnO, $Mg_2Sn$ and $SnO_w$ ($0<w\leq2$) is mentioned.

A composite material containing Si or Sn as a first constituent element and further containing second and third constituent elements is mentioned. The second constituent element is at least one element of, e.g., cobalt, iron, magnesium, titanium, vanadium, chromium, manganese, nickel, copper, zinc, gallium and zirconium. The third constituent element is at least one element of, e.g., boron, carbon, aluminum and phosphorus.

In particular, for the reason that high battery capacity and excellent battery characteristics can be obtained, a single silicon or stannum (trace amounts of impurities may be contained), $SiO_v$ ($0<v\leq2$), $SnO_w$ ($0\leq w\leq2$), a Si—Co—C composite material, a Si—Ni—C composite material, a Sn—Co—C composite material and a Sn—Ni—C composite material are preferable as the metal material.

The alkali metal-containing metal composite oxide material to be used as the negative electrode active material is not limited as long as it can absorb/desorb an alkali metal. In consideration of high current density charge and discharge characteristics, a material containing titanium and an alkali metal is preferable; an alkali metal-containing composite metal oxide material containing titanium is more preferable; and a composite oxide containing an alkali metal and titanium (hereinafter simply referred to as "alkali metal/titanium composite oxide") is further preferable. In short, it is particularly preferable that an alkali metal titanium composite oxide having a spinel structure is added to a negative electrode active material for a battery using an electrolytic solution, because output resistance is greatly reduced.

As the alkali metal titanium composite oxide, it is preferable to use a compound represented by formula:

$$M_xTi_yM^3_zO_4$$

wherein M represents at least one metal selected from Li, Na and K; and $M^3$ represents at least one element selected from the group consisting of Na, K, Co, Al, Fe, Ti, Mg, Cr, Ga, Cu, Zn and Nb.

In the above, M is preferably a metal selected from Li, Na and K, more preferably Li or Na, and further preferably Li.

Of the compounds mentioned above, a compound satisfying the following compositional conditions:

(i) $1.2\leq x\leq1.4$, $1.5\leq y\leq1.7$, $z=0$
(ii) $0.9\leq x\leq1.1$, $1.9\leq y\leq2.1$, $z=0$, and/or
(iii) $0.7\leq x\leq0.9$, $2.1\leq y\leq2.3$, $z=0$ are/is particularly preferable because well-balanced battery performance is obtained.

A particularly preferable composition of the above compound satisfying condition (i) is $M_{4/3}Ti_{5/3}O_4$; the composition satisfying condition (ii) is $M_1Ti_2O_4$; and the composition satisfying condition (iii) is $M_{4/5}Ti_{11/5}O_4$. As a structure of a case satisfying, $Z\neq0$, for example, $M_{4/3}Ti_{4/3}Al_{1/3}O_4$ is preferable.

An active material-containing portion containing a negative electrode active material as mentioned above is preferably formed of a negative-electrode mixture containing the negative electrode active material and can be obtained, for example, by applying the negative-electrode mixture onto a current collector followed by drying it.

It is preferable that the negative-electrode mixture further contains a binding agent, a thickener and a conductive material.

The Electrode of the Present Invention in Alkali Metal Ion Secondary Battery

In the alkali metal ion secondary battery, the electrode of the present invention is used as at least one of the electrodes.

If the electrode of the present invention is used as the positive electrode, oxidative decomposition of the electrolytic solution can be suppressed, with the result that deterioration of the battery and decomposition of a positive electrode structure caused by decomposition of the electrolytic solution can be suppressed. If the electrode of the present invention is used as the negative electrode, a solid electrolyte interface (SEI) structure formed at the interface between the electrode and the electrolytic solution, can be stabilized, attaining satisfactory movement of lithium ions, thereby suppressing an increase of resistance.

The electrode of the present invention used in an alkali metal ion secondary battery contains a perfluoropolyether group-containing compound preferably on an electrode material, and more specifically, on an active material-containing portion.

In an embodiment of the alkali metal ion secondary battery of the present invention, the electrode of the present invention is used only as the positive electrode. If the electrode of the present invention is used only as the positive electrode, oxidative decomposition of the electrolytic solution can be suppressed, and deterioration of the battery and decomposition of a positive electrode structure can be suppressed. The effect is further exerted in a battery to be operated at a higher voltage.

In another embodiment of the alkali metal ion secondary battery of the present invention, the electrode of the present invention is used only as the negative electrode. If the electrode of the present invention is used only as the negative electrode, a solid electrolyte interface (SEI) structure formed at the interface between the electrode and the electrolytic solution can be stabilized, with the result that reductive decomposition of the electrolytic solution can be suppressed up to a certain level and an increase of resistance of an SEI film can be suppressed.

In another embodiment of the alkali metal ion secondary battery of the present invention, the electrode of the present invention is used as both the positive electrode and the negative electrode. If the electrode of the present invention is used as both the positive electrode and negative electrode, oxidative decomposition of the electrolytic solution can be suppressed and further a solid electrolyte interface (SEI) structure formed at the interface between the electrode and the electrolytic solution can be stabilized.

If the electrode of the present invention is used as the positive electrode, in other words, if a perfluoropolyether group-containing compound is present in the positive electrode, oxidative decomposition of the electrolytic solution is suppressed particularly during a high-voltage operation time and deterioration of the battery can be suppressed. In addition, the residual capacity rate of the battery is improved.

The electrode of the present invention to be used as the positive electrode and/or a negative electrode of an alkali metal ion secondary battery may be produced by treating the surface of an electrode material coated with an active material, with a reactive perfluoropolyether group-containing compound, or produced by applying an electrode mixture containing the reactive perfluoropolyether group-containing compound in a step of forming a coating layer of the electrode mixture.

Since the electrode of the present invention contains a perfluoropolyether group-containing compound in the surface, as mentioned above, if the electrode is used as the positive electrode and/or negative electrode of an alkali metal ion secondary battery, preferably a lithium ion secondary battery, the alkali metal ion secondary battery can acquire satisfactory cycle characteristics, a large battery capacity, and satisfactory storage characteristics.

Separator

The separator is used for separating the positive electrode and the negative electrode to prevent a current short circuit caused by contact of both electrodes; at the same time, passing alkali metal ions, preferably lithium ions therethrough. The separator may be a porous film formed of, for example, a synthetic resin or ceramic, or a laminated film formed by laminating at least two types of porous films. As the synthetic resin, for example, polytetrafluoroethylene, polypropylene or polyethylene is mentioned.

Electrolytic Solution

The positive electrode, negative electrode and separator are impregnated with preferably, a liquid electrolyte, i.e., an electrolytic solution. The electrolytic solution is obtained by dissolving an electrolyte salt in a solvent, and optionally contains substances other than the electrolyte such as additives.

The solvent may be any one of nonaqueous solvents such as organic solvents or a mixture of at least two types of nonaqueous solvents.

As the solvent, for example, ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane or tetrahydrofuran is mentioned. Specific examples thereof include 2-methyl tetrahydrofuran, tetrahydropyran, 1,3-dioxolane, 4-methyl-1,3-dioxolane, 1,3-dioxane or 1,4-dioxane, methyl acetate, ethyl acetate, methyl propionate, ethyl propionate, methyl butyrate, methyl isobutyrate, methyl trimethylacetate or ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate and dimethylsulfoxide. If a solvent(s) as mentioned above is used, e.g., excellent battery capacity, cycle characteristics and storage characteristics can be obtained.

Of the solvents, at least one of ethylene carbonate, propylene carbonate, dimethyl carbonate, diethyl carbonate and ethyl methyl carbonate is preferably used. If such a solvent is used, more excellent characteristic can be obtained. In this case, a combination of a high-viscosity (high electric permittivity) solvent (for example, relative electric permittivity ε≥30) such as ethylene carbonate or propylene carbonate and a low-viscosity solvent (for example, viscosity ε≤1 mPa·s) such as dimethyl carbonate, ethyl methyl carbonate or diethyl carbonate, is more preferably used. If these solvents are used in combination, dissociation of an electrolyte salt and ion mobility are improved.

In particular, a solvent as mentioned above preferably contains an unsaturated carbon bond cyclic carbonate. If a solvent contains an unsaturated carbon bond cyclic carbonate, a stable protective film is formed on the surface of a negative electrode during a charge/discharge time, suppressing the decomposition reaction of an electrolytic solution. The unsaturated carbon bond cyclic carbonate refers to a cyclic carbonate having one or two or more unsaturated carbon bonds, such as vinylene carbonate or vinylethylene carbonate. Note that, the content of the unsaturated carbon bond cyclic carbonate in a solvent, although it is not limited, is, for example, 0.01 wt % or more and 10 wt % or less. If the content of the unsaturated carbon bond cyclic carbonate in a solvent falls within the range mentioned above, the decomposition reaction of the electrolytic solution can be suppressed without reducing a battery capacity.

A solvent as mentioned above preferably contains at least one of a halogenated linear carbonate and a halogenated cyclic carbonate. If such a solvent is contained, a stable protective film is formed on the surface of a negative electrode during a charge/discharge time, suppressing the decomposition reaction of an electrolytic solution. The halogenated linear carbonate refers to a linear carbonate having one or two or more halogen groups. The halogenated cyclic carbonate refers to a cyclic carbonate having one or two or more halogen groups. The type of the halogen group is not limited. Of the halogen groups, a fluorine group, a chlorine group or a bromine group is preferable and a fluorine group is more preferable. If a halogen group as mentioned above is used, a higher effect can be obtained. Note that, the number of halogen groups is preferably two rather than one, and may be three or more. If the number of halogen groups increases, a firmer and more stable protective film is obtained. Because of this, the decomposition reaction of an electrolytic solution is more suppressed. The halogenated linear carbonate is, for example, fluoromethyl methyl carbonate, bis(fluoromethyl) carbonate or difluoromethy methyl carbonate. The halogenated cyclic carbonate is, for example, 4-fluoro-1,3-dioxolan-2-one or 4,5-difluoro-1,3-dioxolan-2-one. Note that, the contents of halogenated linear carbonate and halogenated cyclic carbonate in a solvent, although they are not limited, are, for example, 0.01 wt % or more and 50 wt % or less. If the contents fall within the range, the decomposition reaction of an electrolytic solution is more suppressed without excessively reducing a battery capacity.

A solvent as mentioned above may contain sultone (cyclic sulfonate). If a solvent contains sultone (cyclic sulfonate), chemical stability of an electrolytic solution can be more improved. Sultone is, for example, propane sultone or propene sultone. Note that, the content of a sultone in the solvent, although it is not limited, is, for example, 0.5 wt % or more and 5 wt % or less. If the content falls within the range, a reduction of a battery capacity can be suppressed and the decomposition reaction of an electrolytic solution can be suppressed.

A solvent as mentioned above may contain an acid anhydride. If a solvent contains an acid anhydride, chemical stability of an electrolytic solution is more improved. The acid anhydride is, for example, dicarboxylic anhydride, disulfonic acid anhydride or carboxylic acid sulfonic acid anhydride. The dicarboxylic anhydride is, for example, succinic anhydride, glutaric anhydride or maleic anhydride. The disulfonic acid anhydride is, for example, ethane disulfonic anhydride or propane disulfonic anhydride. The carboxylic acid sulfonic acid anhydride is, for example, anhydrous sulfobenzoic acid, anhydrous sulfopropionic acid or anhydrous sulfobutyric acid. Note that, the content of an acid anhydride in a solvent, although it is not limited, is, for example, 0.5 wt % or more and 5 wt % or less. If the content falls within the range, a reduction of a battery capacity can be suppressed and the decomposition reaction of an electrolytic solution can be suppressed.

Electrolyte Salt

The electrolyte salt may contain any one or two types or more of alkali metal salts as described below. Note that, the electrolyte salt may be a salt other than an alkali metal salt (for example, a light metal salt other than an alkali metal salt).

Examples of the alkali metal salt include compounds such as $MPF_6$, $MBF_4$, $MClO_4$, $MAsF_6$, $MB(C_6H_5)_4$, $MCH_3SO_3$, $MCF_3SO_3$, $MAlCl_4$, $M_2SiF_6$, $MCl$ and $MBr$, wherein M represents at least one metal selected from Li, Na and K, preferably a metal selected from Li, Na and K, more preferably Li or Na, and further preferably Li.

If such an alkali metal salt is used, e.g., an excellent battery capacity, cycle characteristics and storage characteristics can be obtained. In particular, at least one selected from $MPF_6$, $MBF_4$, $MClO_4$ and $MAsF_6$ is preferable and $MPF_6$ is more preferable. If such an alkali metal salt is used, internal resistance further decreases and a higher effect can be obtained.

The content of an electrolyte salt as mentioned above relative to a solvent is preferably 0.1 mol/kg or more and 3.0 mol/kg or less. This is because if the content falls within the range, high ion conductivity can be obtained.

<Battery Design>

The structure of the electrodes may be either one of a laminated structure constructed by stacking a positive-electrode plate and a negative-electrode plate with a separator interposed between them and a roll structure constructed by winding a laminate obtained by stacking a positive-electrode plate and a negative-electrode plate with a separator interposed between them, like a coil. The volume ratio of the electrode groups occupied in the battery internal volume (hereinafter referred to as "an electrode group occupancy") is usually 40% or more, preferably 50% or more; and usually 90% or less and preferably 80% or less.

If the electrode group occupancy is below the range, battery capacity is low. In contrast, if the electrode group occupancy exceeds the range, the void space becomes low. In this case, if the temperature of the battery increases, members expand or the vapor pressure of liquid component of an electrolyte increases, increasing internal pressure. As a result, the charge and discharge repeatability of the battery and characteristics such as high temperature storage stability deteriorate and, in some cases, further a gas release valve for releasing internal pressure is actuated.

The structure of the current collector is not limited. To effectively improve charge and discharge characteristics at a high current density by the electrolytic solution, it is preferable to form a structure having wiring and joining parts reduced in resistance.

If the electrodes are laminated, it is suitable to use a structure formed by bundling the metal core portion of individual electrode layers and fixing the bundle to a terminal by welding. If a single electrode area is large, since the internal resistance increases, a plurality of terminals are provided within the electrode to reduce resistance. If the electrodes are wound like a coil, the internal resistance can be reduced by providing a plurality of lead-like structures in the positive electrodes and negative electrodes and bundling them and fixing the bundle to a terminal.

The material for an exterior case is not limited as long as it is a substance stable to the electrolytic solution to be used. More specifically, a metal such as a nickel plated steel sheet, stainless steel, aluminum or an aluminum alloy or a magnesium alloy or a laminated film (laminate film) of a resin and an aluminum foil, is used. To reduce weight, a metal such as aluminum or an aluminum alloy or a laminate film can be suitably used.

In the exterior case made of metals, metals are mutually welded by laser welding, resistance welding or ultrasonic welding to form a hermetically sealed structure or a structure formed of the metals by caulking via a resin gasket. In the exterior case made of a laminate film as mentioned above, resin layers are heat-sealed to obtain a hermetically sealed structure. To improve sealability, a resin different in type from the resin used in the laminate film may be interposed between the resin layers. Particularly, when a sealed structure is formed by heat-sealing of resin layers via a current collector terminal, a metal and a resin are joined. For the reason, a resin having a polar group and a resin modified by introducing a polar group therein are suitably used as the resin to be interposed.

The shape of the alkali metal ion secondary battery of the present invention can be arbitrarily selected. For example, a cylindrical type, a square shape, a laminate and a coin (these may be large in size) are mentioned. Note that, the shapes and structure of the positive electrode, negative electrode and separator to be used may be changed depending on the shape of a battery.

<Electronics and Module>

An electrochemical device as mentioned above can be used in various electronics or modules. Accordingly, the present invention provides electrochemical devices of the present invention, particularly an electronic device or a module having a lithium ion secondary battery.

Examples

Now, the present invention will be described by way of Examples; however, the present invention is not limited to these Examples alone.

(Preparation of Electrolytic Solution)

Ethylene carbonate as a high-permittivity solvent and ethyl methyl carbonate as a low-viscosity solvent were mixed so as to satisfy a volume ratio 30 to 70. To the solvent mixture, $LiPF_6$ was added so as to obtain a concentration of 1.0 mole/liter to obtain a nonaqueous electrolytic solution.

(Production of Lithium Ion Secondary Battery)

$LiNi_{1/3}Mn_{1/3}Co_{1/3}O_2$ was used as a positive electrode active material. Carbon black was used as a conductive material. A dispersion of polyvinylidene fluoride (PVdF) in N-methyl-2-pyrrolidone was used as a binding agent. The active material, conductive material and binding agent were mixed so as to satisfy a solid content ratio of 92/3/5 (mass % ratio) to prepare a slurry-state positive-electrode mixture. The slurry-state positive-electrode mixture obtained was uniformly applied to an aluminum-foil current collector having a thickness of 20 µm, dried and compression-molded by a press machine to obtain a positive electrode laminate. The positive electrode laminate was punched by a punching machine to obtain circular positive electrode materials having a diameter of 1.6 cm.

An artificial graphite powder and amorphous silicon (SiO) were used as a negative electrode active material. An aqueous dispersion of sodium carboxylmethyl cellulose (the concentration of sodium carboxymethyl cellulose: 1 mass %) was used as a thickener. An aqueous dispersion of a styrene-butadiene rubber (styrene-butadiene rubber concentration 50 mass %) was used as a binding agent. The active material, thickener and binding agent were mixed so as to satisfy a solid content ratio of 93/4.6/1.2/1.2 (mass % ratio) to prepare a slurry-state negative-electrode mixture. The slurry-state negative-electrode mixture obtained was uniformly applied to a copper foil having a thickness of 20 µm, dried and compression-molded by a press machine to obtain a negative electrode. The negative electrode was punched by a punching machine to obtain circular negative electrode materials having a diameter of 1.6 cm.

The positive electrode material and negative electrode material obtained above were subjected to a coating treatment with each of the compounds shown in Table 1 below and the treatment was performed in the following manner.

Coating Treatment (Dip Method)

The following fluorine compounds (compounds 1 to 5) were each diluted with hydrofluoroether (HFE7200, manufactured by SUMITOMO 3M) so as to satisfy a solid content of 0.1%. After an electrode material was dipped in the diluted solution for one minute, excessive compound present on the surface of the electrode material was washed away with HFE7200. Thereafter, the electrode material was dried to obtain an electrode having the surface treated with the fluorine compound.

Treatment with Coating Agent (Physical Vapor Deposition (PVD) Method)

The following fluorine compounds (compounds 1 to 5) were each weighed and put in a copper container, which was set in a resistance heating vessel in the vacuum chamber; and an electrode material was set in an upper portion of the chamber. Thereafter, the internal pressure of the chamber was controlled to be $10^{-3}$ Pav by a vacuum pump. The resistance heating of the compound in the copper container was carried out to deposit the compound onto the electrode material. In this manner, an electrode whose surface was treated with the compound was obtained. Note that, if the compound was applied with a throughput of 50 mg (in terms of solid content) per $m^2$ (0.01 mg per a single electrode sheet), a film thickness of 9 to 10 nm can be obtained. The film thickness is defined as a film thickness measured by a crystal oscillator set in the vapor deposition chamber.

Compound 1 (PFPE-Si):
$CF_3CF_2CF_2O$—$(CF_2CF_2CF_2O)_n$—$CF_2CF_2$—$(CH_2CH(Si(OMe)_3))_n$—H, wherein n used in the portion "$CF_3CF_2CF_2O$—$(CF_2CF_2CF_2O)_n$—$CF_2CF_2$" represents 25.

Compound 2 (PFPE-OH):
$CF_3CF_2CF_2O$—$(CF_2CF_2CF_2O)_n$—$CF_2CF_2CF_2CH$, wherein n=25

Compound 3 (PFPE-COOH):
$CF_3CF_2CF_2O$—$(CF_2CF_2CF_2O)_n$—$CF_2CF_2CF_2COOH$ wherein n=25

Compound 4:
$CF_3CF_2CF_2O$—$(CF_2CF_2CF_2O)_n$—$CF_3$ wherein n=25

Compound 5:
$CF_3CF_2CF_2CF_2CF_2CF_2CH_2CH_2$—$Si(OMe)_3$

The circular positive electrode and negative electrode were allowed to face each other with a microporous polyethylene film (separator) having a thickness 20 µm interposed between them, and then, the nonaqueous electrolytic solution obtained above was poured. After the electrodes and separator were sufficiently impregnated with the electrolytic solution, they were sealed, preliminarily charged and allowed to stand still (for aging) to form a coin-type lithium ion secondary battery.

(Determination of Battery Characteristics)

The cycle capacity retention rates and resistance increase rates of the coin-type lithium ion secondary batteries obtained in this manner were checked.

(Cycle Capacity Retention Rate)

The secondary batteries produced above were charged with a current corresponding to 0.5 C up to 4.2 V (refers to constant current/constant voltage charging (hereinafter referred to as "CC/CV charging") (0.1 C cut)) at 25° C.; thereafter discharged with a constant current of 0.5 C up to 3 V. This operation was defined as a single cycle. The initial discharge capacity was obtained from the discharge capacity at the first cycle. The unit 1 C herein represents a current value required for discharging the reference capacity of a battery in one hour. For example, 0.5 C represents ½ of the current value. The batteries were charged again up to 4.2 V in accordance with the CC/CV charging (0.1 C cut) and then, charge and discharge were carried out in the same manner as above. After 200 cycles, the discharge capacity was measured. The ratio of the discharge capacity after 200 cycles relative to the initial discharge capacity was obtained based on the following expression and specified as a cycle capacity retention rate (%). The measurement temperature was set to be 60° C. The results are shown in Table 1 below.

(Discharge capacity after 200 cycles)/(Initial discharge capacity)×100=Cycle capacity retention rate (%)

(Resistance Increase Rate)

A charge and discharge cycle performed in predetermined conditions (charged at 0.5 C under a predetermined voltage until the charging current became 0.1 C and discharged at a current equivalent to 1 C up to 3.0 V) was defined as a single cycle. The resistance after 3 cycles and the resistance after 200 cycles were measured. The measurement temperature was set to be 25° C. A resistance increase rate was obtained based on the following expression. The results are shown in Table 1.

Resistance increase rate (%)=Resistance after 200 cycles (Ω)/Resistance (Ω) after 3 cycles×100

TABLE 1

|  | Compound for coating | | | | Cycle capacity retention rate (%) | Resistance increase rate (%) |
| --- | --- | --- | --- | --- | --- | --- |
|  | Positive electrode | Treatment method (throughput) | Negative electrode | Treatment method | | |
| Example 1 | Compound 1 | PVD (0.01 mg) | Compound 1 | PVD (0.01 mg) | 95 | 132 |
| Example 2 | — | — | Compound 1 | PVD (0.01 mg) | 94 | 131 |
| Example 3 | — | — | Compound 1 | Dip | 91 | 121 |
| Example 4 | — | — | Compound 2 | Dip | 89 | 135 |
| Example 5 | — | — | Compound 3 | Dip | 84 | 141 |
| Example 6 | — | — | Compound 4 | Dip | 81 | 149 |

TABLE 1-continued

| | Compound for coating | | | | Cycle capacity retention rate (%) | Resistance increase rate (%) |
|---|---|---|---|---|---|---|
| | Positive electrode | Treatment method (throughput) | Negative electrode | Treatment method | | |
| Example 7 | — | — | Compound 1 | PVD (0.001 mg) | 93 | 133 |
| Example 8 | — | — | Compound 1 | PVD (0.025 mg) | 94 | 135 |
| Comparative example 1 | — | — | Compound 5 | Dip | 77 | 151 |
| Comparative example 2 | — | — | — | — | 76 | 150 |

*"—" indicates no coating.
*PVD throughput represents the weight per electrode.

(Preparation of Electrolytic Solution)

Ethylene carbonate, monofluoroethylene carbonate as a high-permittivity solvent and ethyl methyl carbonate as a low-viscosity solvent were mixed so as to satisfy a volume ratio 20:10:70. To the solvent mixture, $LiPF_6$ was added so as to satisfy a concentration of 1.0 mole/liter to obtain a nonaqueous electrolytic solution.

(Production of Lithium Ion Secondary Battery)

$LiNi_{0.5}Mn_{1.5}O_2$ was used as a positive electrode active material. Carbon black was used as a conductive material. A dispersion of polyvinylidene fluoride (PVdF) in N-methyl-2-pyrrolidone was used as a binding agent. The active material, conductive material and binding agent were mixed so as to satisfy a solid content ratio of 90/4/6 (mass % ratio) to prepare a slurry-state positive-electrode mixture. The slurry-state positive-electrode mixture obtained was uniformly applied to an aluminum-foil current collector having a thickness of 20 μm, dried and compression-molded by a press machine to obtain a positive electrode laminate. The positive electrode laminate was punched by a punching machine to obtain circular positive electrode materials having a diameter of 1.6 cm.

A lithium ion secondary battery was produced in the same manner as above except the aforementioned conditions.

(Determination of Battery Characteristics)

The cycle capacity retention rates and resistance increase rates of the coin-type lithium ion secondary batteries obtained were checked as follows.

(Residual Capacity Rate)

The secondary batteries produced above were charged with a current corresponding to 0.5 C up to 4.9 V (refers to constant current/constant voltage charging (hereinafter referred to as "CC/CV charging")(0.1 C cut) at 25° C.; thereafter discharged with a constant current of 0.5 C up to 3 V. This operation was defined as a single cycle. The initial discharge capacity was obtained from the discharge capacity at the third cycle. The unit 1 C herein represents a current value when the reference capacity of a battery is discharged in one hour. For example, 0.5 C represents ½ of the current value. The batteries were charged again up to 4.9 V in accordance with the CC/CV charging (0.1 C cut) and thereafter, stored at a high temperature of 85° C. for 18 hours. After the storage, the batteries were discharged at 25° C. and 0.5 C up to 3 V. This is specified as a residual capacity. After storage at high temperature, the residual capacity was measured. The ratio of the residual capacity relative to the initial discharge capacity was obtained and specified as a residual capacity rate (%).

(Residual capacity)/(Initial discharge capacity)× 100=Residual capacity rate (%)

(Resistance Increase Rate)

A charge and discharge cycle performed in predetermined conditions (charged at 0.5 C under a predetermined voltage until the charging current became 0.1 C and discharged at a current corresponding to 1 C up to 3.0 V) was defined as a single cycle. The resistance after 3 cycles and the resistance after 200 cycles were measured. The measurement temperature was set to be 25° C. A resistance increase rate was obtained based on the following expression. The results are shown in Table 2.

Resistance increase rate (%)=Resistance after 200 cycles (Ω)/Resistance (Ω) after 3 cycles×100

TABLE 2

| | Compound for coating | | | | Residual capacity rate (%) | Resistance increase rate (%) |
|---|---|---|---|---|---|---|
| | Positive electrode | Treatment method (throughput) | Negative electrode | Treatment method | | |
| Example 9 | Compound 1 | PVD (0.01 mg) | Compound 1 | PVD (0.01 mg) | 88 | 151 |
| Example 10 | Compound 1 | PVD (0.01 mg) | — | — | 87 | 150 |
| Example 11 | Compound 1 | Dip | — | — | 85 | 144 |
| Example 12 | Compound 2 | Dip | — | — | 84 | 161 |
| Example 13 | Compound 3 | Dip | — | — | 77 | 181 |
| Example 14 | Compound 4 | Dip | — | — | 74 | 183 |
| Example 15 | Compound 1 | PVD (0.0001 mg) | — | — | 84 | 155 |
| Example 16 | Compound 1 | PVD (0.0003 mg) | — | — | 85 | 153 |

TABLE 2-continued

| | Compound for coating | | | | Residual capacity rate (%) | Resistance increase rate (%) |
|---|---|---|---|---|---|---|
| | Positive electrode | Treatment method (throughput) | Negative electrode | Treatment method | | |
| Example 17 | Compound 1 | PVD (0.0005 mg) | — | — | 86 | 152 |
| Example 18 | Compound 1 | PVD (0.001 mg) | — | — | 87 | 151 |
| Example 19 | Compound 1 | PVD (0.03 mg) | — | — | 86 | 150 |
| Example 20 | Compound 1 | PVD (0.05 mg) | — | — | 85 | 145 |
| Comparative example 3 | Compound 5 | Dip | — | — | 71 | 199 |
| Comparative example 4 | — | — | — | — | 70 | 168 |

As is apparent from the above results, cycle capacity characteristics or residual capacity rate and resistance increase rate of batteries were improved by using the electrode of the present invention coated with a perfluoropolyether group-containing compound. Particularly, in the cases of using a perfluoropolyether group-containing silane compound and a perfluoropolyether group-containing alcohol compound, particularly in the cases of using a perfluoropolyether group-containing silane compound, the effects were remarkable.

INDUSTRIAL APPLICABILITY

The alkali metal battery of the present invention, since it is excellent in cycle characteristics, can be usefully used various electronics, particularly electronics having a high frequency of use, such as smart phones, mobile phones, tablet terminals and laptop computers.

The invention claimed is:
1. An electrochemical device which is an alkali metal battery or an alkaline earth metal battery comprising
   an electrode having a perfluoropolyether group-containing compound in a surface thereof,
wherein:
   the perfluoropolyether group-containing compound is present as a coating layer,
   the thickness of the coating layer is 0.3 to 50 nm, and
   the perfluoropolyether group-containing compound is a compound represented by the following formula (A1), (A2), (B1), (B2), (C1), (C2), (D1), or (D2):

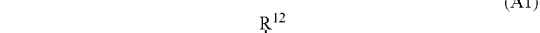
(A1)

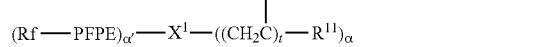
(A2)

(B1)

(B2)

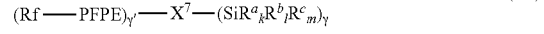
(C1)

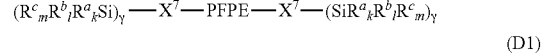
(C2)

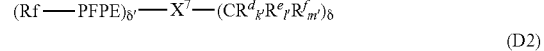
(D1)

(D2)

wherein:
   Rf each independently represents an alkyl group having 1 to 16 carbon atoms optionally substituted with one or more fluorine atoms;
   PFPE each independently represents $-(OC_6F_{12})_a-(OC_5F_{10})_b-(OC_4F_8)_c-(OC_3F_6)_d-(OC_2F_4)_e-(OCF_2)_f$, wherein a, b, c, d, e and f each independently represent an integer of 0 or more and 200 or less, and the sum of a, b, c, d, e and f is at least 1, the repeating units enclosed in parentheses attached with a, b, c, d, e or f are present in any order;
   $R^1$ each independently in each occurrence represents a hydrogen atom or an alkyl group having 1 to 22 carbon atoms;
   $R^2$ each independently in each occurrence represents a hydroxyl group or a hydrolyzable group;
   $R^{11}$ each independently in each occurrence represents a hydrogen atom or a halogen atom;
   $R^{12}$ each independently in each occurrence represents a hydrogen atom or a lower alkyl group;
   n represents an integer of 0 to 3 independently for each $(-SiR^1_nR^2_{3-n})$ unit;
   provided that, in formulae (A1), (A2), (B1) and (B2), at least one $R^2$ is present;
   $X^1$ each independently represents a single bond or a 2 to 10 valent organic group;
   $X^2$ each independently in each occurrence represents a single bond or a divalent organic group;
   t each independently in each occurrence represents an integer of 1 to 10;
   α each independently represents an integer of 1 to 9;
   α' represents an integer of 1 to 9;
   $X^5$ each independently represents a single bond or a 2 to 10 valent organic group;
   β each independently represents an integer of 1 to 9;
   β' represents an integer of 1 to 9;
   $X^7$ each independently represents a single bond or a 2 to 10 valent organic group;

γ each independently represents an integer of 1 to 9;
γ' represents an integer of 1 to 9;
$R^a$ each independently in each occurrence represents
—Z—$SiR^{71}_p R^{72}_q R^{73}_r$;
Z each independently in each occurrence represents an oxygen atom or a divalent organic group;
$R^{71}$ each independently in each occurrence represents $R^{a\prime}$;
$R^{a\prime}$ is the same as defined in $R^a$;
in $R^a$, the number of Si linearly connected via Group Z, is at most 5;
$R^{72}$ each independently in each occurrence represents a hydroxyl group or a hydrolyzable group;
$R^{73}$ each independently in each occurrence represents a hydrogen atom or a lower alkyl group;
p each independently in each occurrence represents an integer of 0 to 3;
q each independently in each occurrence represents an integer of 0 to 3;
r each independently in each occurrence represents an integer of 0 to 3;
provided that, the sum of p, q and r is 3 for each —Z—$SiR^{71}_p R^{72}_q R^{73}_r$, and at least one $R^{72}$ is present in formulae (C1) and (C2);
$R^b$ each independently in each occurrence represents a hydroxyl group or a hydrolyzable group;
$R^C$ each independently in each occurrence represents a hydrogen atom or a lower alkyl group;
k each independently in each occurrence represents an integer of 1 to 3;
l each independently in each occurrence represents an integer of 0 to 2;
m each independently in each occurrence represents an integer of 0 to 2;
provided that, in the unit enclosed in parentheses attached with γ, the sum of k, l and m is 3;
$X^9$ each independently represents a single bond or a 2 to 10 valent organic group;
δ each independently represents an integer of 1 to 9;
δ' represents an integer of 1 to 9;
$R^d$ each independently in each occurrence represents
—Z'—$CR^{81}_p R^{82}_q R^{83}_r$;
Z' each independently in each occurrence represents an oxygen atom or a divalent organic group;
$R^{81}$ each independently in each occurrence represents $R^{d\prime}$;
$R^{d\prime}$ is the same as defined in $R^d$;
in $R^d$, the number of C linearly connected via group Z' is at most 5;
$R^{82}$ each independently in each occurrence represents
—Y—$SiR^{85}_j R^{86}_{3-j}$;
Y each independently in each occurrence represents a divalent organic group;
$R^{85}$ each independently in each occurrence represents a hydroxyl group or a hydrolyzable group;
$R^{86}$ each independently in each occurrence represents a hydrogen atom or a lower alkyl group;
j represents an integer of 1 to 3 independently for each (—Y—$SiR^{85}_j R^{86}_{3-j}$) unit;
$R^{83}$ each independently in each occurrence represents a hydrogen atom or a lower alkyl group;
p' each independently in each occurrence represents an integer of 0 to 3;
q' each independently in each occurrence represents an integer of 0 to 3;
r' each independently in each occurrence represents an integer of 0 to 3;
$R^e$ each independently in each occurrence represents
—Y—$SiR^{85}_j R^{86}_{3-j}$;
$R^f$ each independently in each occurrence represents a hydrogen atom or a lower alkyl group;
k' each independently in each occurrence represents an integer of 0 to 3;
l' each independently in each occurrence represents an integer of 0 to 3;
m' each independently in each occurrence represents an integer of 0 to 3;
provided that, in the formula, at least one q' represents an integer of 2 or 3 or at least one l' represents an integer of 2 or 3.

2. The electrochemical device according to claim 1, wherein only a positive electrode of the alkali metal battery or the alkaline earth metal battery is the electrode according to claim 1.

3. The electrochemical device according to claim 1, wherein at least one of a positive electrode and a negative electrode of the alkali metal battery or the alkaline earth metal battery is the electrode according to claim 1.

* * * * *